(12) United States Patent
Kang et al.

(10) Patent No.: US 10,275,005 B2
(45) Date of Patent: Apr. 30, 2019

(54) ELECTRONIC DEVICE AND METHOD FOR CONTROLLING POWER THEREOF

(71) Applicant: SAMSUNG ELECTRONICS CO., LTD., Suwon-si, Gyeonggi-do (KR)

(72) Inventors: Hyuk Kang, Hwaseong-si (KR); Dong Rak Shin, Gwangju-si (KR); Young Jin Park, Suwon-si (KR); Kyoung Hoon Kim, Seoul (KR); Chi Jung Ha, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 54 days.

(21) Appl. No.: 15/401,396

(22) Filed: Jan. 9, 2017

(65) Prior Publication Data

US 2017/0212574 A1    Jul. 27, 2017

(30) Foreign Application Priority Data

Jan. 22, 2016    (KR) ........................ 10-2016-0008277

(51) Int. Cl.
*G06F 1/26*    (2006.01)
*G06F 1/30*    (2006.01)
*G06F 1/28*    (2006.01)

(52) U.S. Cl.
CPC ................ *G06F 1/30* (2013.01); *G06F 1/266* (2013.01); *G06F 1/28* (2013.01)

(58) Field of Classification Search
CPC ... G06F 1/30; G06F 1/266; G06F 1/28; G06F 1/26; G02B 27/017; H02J 7/0072; H02J 7/0031; B60L 11/1851
See application file for complete search history.

(56) References Cited

U.S. PATENT DOCUMENTS

| | | | | |
|---|---|---|---|---|
| 5,969,438 A | * | 10/1999 | Odaohara | H02J 7/0031 307/64 |
| 6,661,462 B2 | | 12/2003 | Ohnogi | |
| 6,727,865 B1 | * | 4/2004 | Yonezawa | G02B 27/017 345/7 |
| 8,957,835 B2 | | 2/2015 | Hoellwarth | |
| 9,182,799 B2 | | 10/2015 | Cheng | |

(Continued)

FOREIGN PATENT DOCUMENTS

EP    2905859    8/2015
KR    10-2014-0105319    9/2014

OTHER PUBLICATIONS

Extended Search Report dated Sep. 22, 2017 in counterpart European Patent Application No. EP17152482.0.

(Continued)

*Primary Examiner* — Richard J Hong
(74) *Attorney, Agent, or Firm* — Nixon & Vanderhye P.C.

(57) ABSTRACT

An electronic device is provided. The electronic device includes a first connector including a first pin and a second pin configured to connect with a first external electronic device, a second connector configured to connect with a second external electronic device, a connection sensing circuit configured to sense a connection or disconnection of the second external electronic device coupled to the first pin via the second connector, and a switch configured to supply power received from the first external electronic device via the second pin to the first pin if the disconnection is sensed via the connection sensing circuit.

17 Claims, 21 Drawing Sheets

(56) References Cited

U.S. PATENT DOCUMENTS

| | | |
|---|---|---|
| 9,429,759 B2 | 8/2016 | Hoellwarth |
| 9,482,869 B2 | 11/2016 | Hoellwarth |
| 9,583,975 B2 | 2/2017 | Talmola et al. |
| 2002/0031350 A1 | 3/2002 | Ohnogi |
| 2010/0070659 A1 | 3/2010 | Ma et al. |
| 2010/0079356 A1 | 4/2010 | Hoellwarth |
| 2014/0354080 A1 | 12/2014 | Sung et al. |
| 2015/0006919 A1 | 1/2015 | Cheng |
| 2015/0008749 A1 | 1/2015 | Rhee |
| 2015/0022154 A1 | 1/2015 | Kim |
| 2015/0198811 A1 | 7/2015 | Hoellwarth |
| 2015/0229161 A1 | 8/2015 | Talmola et al. |
| 2015/0280493 A1 | 10/2015 | Cha et al. |
| 2016/0072341 A1* | 3/2016 | Tamura ............... B60L 11/1851 307/66 |
| 2016/0085076 A1 | 3/2016 | Hoellwarth |
| 2016/0327799 A1 | 11/2016 | Hoellwarth |
| 2016/0365064 A1 | 12/2016 | Hoellwarth |
| 2017/0011716 A1 | 1/2017 | Hoellwarth |

OTHER PUBLICATIONS

Search Report and Written Opinion dated Mar. 28, 2017 in counterpart International Patent Application No. PCT/KR2017/000136.

* cited by examiner

ELECTRONIC DEVICE AND METHOD FOR CONTROLLING POWER THEREOF

CROSS-REFERENCE TO RELATED APPLICATION

This application is based on and claims priority under 35 U.S.C. § 119 to a Korean patent application filed on Jan. 22, 2016 in the Korean Intellectual Property Office and assigned Serial number 10-2016-0008277, the disclosure of which is incorporated by reference herein in its entirety.

TECHNICAL FIELD

The present disclosure relates generally to an electronic device, for example, a method for adaptively managing power of the electronic device and the electronic device for supporting the same.

BACKGROUND

Electronic devices, for example, smartphones, tablet personal computers (PCs), laptop computers, or the like are used in a variety of fields due to convenience of use and easy portability. Recently, there has been a growing interest in an external device operatively connected with an electronic device, for example, an accessory device (e.g., a head-mounted display (HMD) device, a docking station, or the like). Also, the accessory device may be connected with an auxiliary accessory device, for example, a power supply.

An electronic device, for example, an HMD device may be used by being operatively connected with a mobile terminal and the like. In this case, the HMD device may receive power from the mobile terminal. Also, the HMD device may be connected with an auxiliary accessory device, for example, a power supply. In this case, the HMD device may be used by receiving power from the power supply.

If the HMD device which is used by receiving power from the power supply is disconnected from the power supply, the HMD device may be temporarily powered off. For example, before a mobile terminal recognizes that the HMD device is disconnected from the power supply and supplies power to the HMD device, the HMD device may be temporarily powered off. Such temporal power-off is distraction from user experience. Thus, in any case, it is necessary to continue maintaining power of the HMD device which is in use.

SUMMARY

Example aspects of the present disclosure address at least the above-mentioned problems and/or disadvantages and to provide at least the advantages described below. Accordingly, an example aspect of the present disclosure is to provide a method for temporarily receiving power from a mobile terminal and the like connected with a head-mounted display (HMD) device although a power supply and the HMD device are disconnected from each other and maintaining power of the HMD device.

In accordance with an example aspect of the present disclosure, an electronic device is provided. The electronic device may include a first connector comprising a first pin and a second pin configured to connect with a first external electronic device, a second connector configured to connect with a second external electronic device, and a switch configured to supply power received from the first external electronic device via the second pin to the first pin, if the second external electronic device connected with the electronic device via the second connector is disconnected from the electronic device.

In accordance with another example aspect of the present disclosure, an electronic device is provided. The electronic device may include a connector comprising a first pin and a second pin configured to connect with an external electronic device and a processor. The processor may be configured to verify reception of first power via the first pin from the external electronic device and supply second power to the external electronic device via the second pin based on the at least reception of the first power.

In accordance with another example aspect of the present disclosure, an electronic device is provided. The electronic device may include a first connector comprising a first pin and a second pin and configured to be attachable to a mobile terminal, a second connector configured to be attachable to a power supply, and a backflow prevention circuit configured to be electrically connected with the second pin and configured to not supply current from the electronic device to the mobile terminal via the second pin. The first pin and the second connector may establish a first electronic path. One point on the first electronic path, the second pin, and the backflow prevention circuit may establish a second electronic path. The electronic device may be configured to supply power to the mobile terminal via the first electronic path, if the power supply is attached to the second connector and receive power from the mobile terminal via the second electronic path in response to detachment of the power supply from the second connector.

In accordance with another example aspect of the present disclosure, a method of controlling an electronic device is provided. The method may include notifying a mobile terminal that the electronic device is connected with a power supply, if the electronic device is attached to the power supply, supplying power to the mobile terminal via a first electronic path, receiving power from the mobile terminal via a second electronic path in response to detachment of the power supply from the electronic device, notifying the mobile terminal that the electronic device is disconnected from the power supply, and receiving power from the mobile terminal via the first electronic path.

In accordance with another example aspect of the present disclosure, a non-transitory storage medium storing instructions for executing a control method of an electronic device, the instructions, when executed by a processor, causing the processor to notify a mobile terminal that the electronic device is connected with a power supply, if the electronic device is attached to the power supply, to supply power to the mobile terminal via a first electronic path, to transmit a notification that the electronic device is disconnected from the power supply to the mobile terminal, if receiving power from the mobile terminal via a second electronic path in response to detachment of the power supply from the electronic device, and to stop receiving the power via the second electronic path in response to the notification of the disconnection and to receive power from the mobile terminal via the first electronic path.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and attendant advantages of the present disclosure will be more apparent and readily understood from the following detailed description, taken in conjunction with the accompanying drawings, in which like reference numerals refer to like elements, and wherein.

Throughout the drawings, it should be noted that like reference numbers are used to depict the same or similar elements, features, and structures.

DETAILED DESCRIPTION

Figure 1:
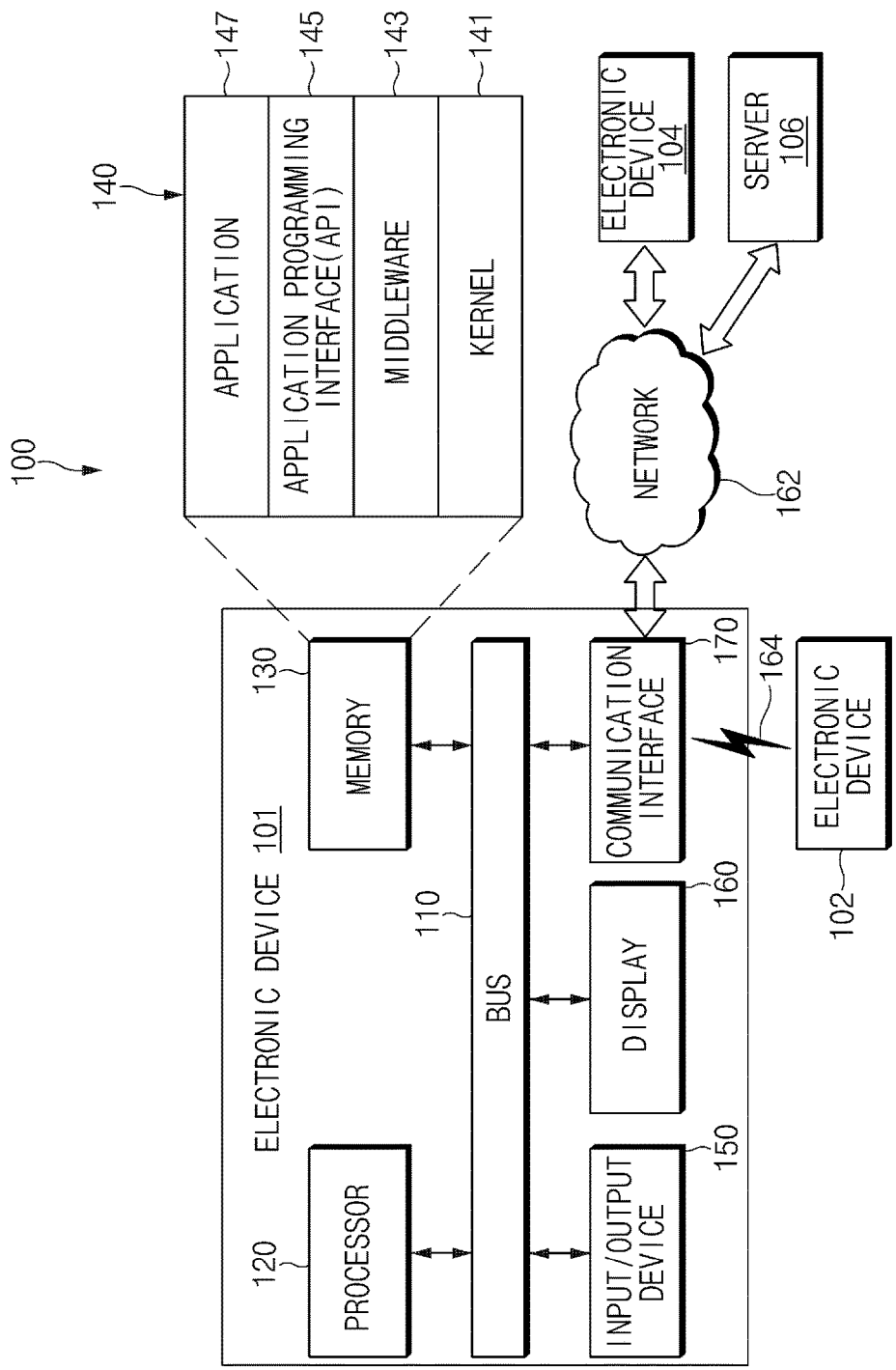
FIG. 1 is a block diagram illustrating an example electronic device in a network environment according to an example embodiment of the present disclosure.

Hereinafter, the present disclosure is described with reference to the accompanying drawings. Various modifications are possible in various example embodiments of the present disclosure and are illustrated in drawings and related detailed descriptions are listed. However, the present disclosure is not intended to be limited to the specific embodiments, and it is understood that it includes all modifications and/or, equivalents and substitutes within the scope and technical range of the present disclosure. With respect to the descriptions of the drawings, like reference numerals refer to like elements.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The expressions such as "1st", "2nd", "first", or "second", and the like used in various embodiments of the present disclosure may refer to various elements irrespective of the order and/or priority of the corresponding elements, but do not limit the corresponding elements. The expressions may be used to distinguish one element from another element. For instance, both "a first user device" and "a second user device" indicate different user devices from each other irrespective of the order and/or priority of the corresponding elements. For example, a first component may be referred to as a second component and vice versa without departing from the scope of the present disclosure.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. On the other hand, when an element (e.g., a first element) is referred to as being "directly coupled with/to" or "directly connected to" another element (e.g., a second element), it should be understood that there is no intervening element (e.g., a third element).

Depending on the situation, the expression "configured to" used herein may be used as, for example, the expression "suitable for", "having the capacity to", "designed to", "adapted to", "made to", or "capable of". The term "configured to" does not mean only "specifically designed to" in hardware. Instead, the expression "a device configured to" may mean that the device is "capable of" operating together with another device or other components. For example, a "processor configured to perform A, B, and C" may refer, for example, to a dedicated processor, a generic-purpose processor (e.g., a central processing unit (CPU) or an application processor) which may perform corresponding operations by executing one or more software programs which stores a dedicated processor (e.g., an embedded processor) for performing a corresponding operation.

Terms used in this description are used to describe various example embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal manner unless expressly so defined herein in various example embodiments of the present disclosure. In some cases, even if terms are terms which are defined in the disclosure, they should not be interpreted to exclude embodiments of the present disclosure.

A description will be given of an electronic device 101 in a network environment 100 with reference to FIG. 1 in various example embodiments.

Referring to FIG. 1, the electronic device 101 may be implemented as devices of various purposes. For example, the electronic device 101 may implemented as, but not limited to, a mobile phone, a smartphone, a laptop computer, a tablet device, an electronic-book (e-book) device, a digital broadcast terminal, a personal digital assistants (PDA), a portable multimedia player (PMP), a navigation device, or a wearable device such as a smart watch or smart glasses.

The electronic device 101 may include a bus 110, a processor (e.g., including processing circuitry) 120, a memory 130, an input and output (I/O) interface (e.g., including input/output circuitry) 150, a display 160, and a communication interface (e.g., including communication circuitry) 170. In various example embodiments, at least one of the components may be omitted from the electronic device 101, and other components may be additionally included in the electronic device 101.

The bus 110 may be, for example, a circuit which connects the components 120 to 170 with each other and transmits communication (e.g., a control message and/or data) between the components 120 to 170.

The processor 120 may include various processing circuitry, such as, for example, and without limitation, one or more of a dedicated processor, a central processing unit (CPU), an application processor (AP), or a communication processor (CP). For example, the processor 120 may perform calculation or data processing about control and/or communication of at least another of the components of the electronic device 101.

The memory 130 may include a volatile and/or non-volatile memory. The memory 130 may store, for example, a command or data associated with at least another of the components of the electronic device 101. According to an embodiment, the memory 130 may software and/or a program 140. The program 140 may include, for example, a kernel 141, a middleware 143, an application programming interface (API) 145, and/or at least one application program (or "application") 147. At least part of the kernel 141, the middleware 143, or the API 145 may be referred to as an operating system (OS).

The kernel 141 may control or manage, for example, system resources (e.g., the bus 110, the processor 120, or the memory 130, and the like) used to execute an operation or function implemented in the other programs (e.g., the middleware 143, the API 145, or the application program 147). Also, as the middleware 143, the API 145, or the application program 147 accesses a separate component of the electronic device 101, the kernel 141 may provide an interface which may control or manage system resources.

The middleware 143 may play a role as, for example, a go-between such that the API 145 or the application program 147 communicates with the kernel 141 to communicate data.

Also, the middleware 143 may process one or more work requests, received from the application program 147, in order of priority. For example, the middleware 143 may assign priority which may use system resources (the bus 110, the processor 120, or the memory 130, and the like) of the electronic device 101 to at least one of the application program 147. For example, the middleware 143 may perform scheduling or load balancing for the one or more work requests by processing the one or more work requests in order of priority assigned to the at least one of the application program 147.

The API 145 may be, for example, an interface in which the application program 147 controls a function provided from the kernel 141 or the middleware 143. For example, the API 145 may include at least one interface or function (e.g., a command) for file control, window control, image processing, or text control, and the like.

The I/O interface 150 may include various I/O circuitry and play a role as, for example, an interface which may send a command or data, input from a user or another external device, to another component (or other components) of the electronic device 101. Also, the I/O interface 150 may output a command or data, received from another component (or other components) of the electronic device 101, to the user or the other external device.

The display 160 may include, for example, a liquid crystal display (LCD), a light emitting diode (LED) display, an organic LED (OLED) display, a microelectromechanical systems (MEMS) display, or an electronic paper display, or the like, but is not limited thereto. The display 160 may display, for example, a variety of content (e.g., text, an image, a video, an icon, or a symbol, and the like) to the user. The display 160 may include a touch screen, and may receive, for example, a touch, a gesture, proximity, or a hovering input using an electronic pen or part of a body of the user.

The communication interface 170 may include various communication circuitry and may establish communication between, for example, the electronic device 101 and an external device (e.g., a first external electronic device 102, a second external electronic device 104, or a server 106). For example, the communication interface 170 may connect to a network 162 through wireless communication or wired communication and may communicate with the external device (e.g., the second external electronic device 104 or the server 106).

The wireless communication may use, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like as a cellular communication protocol. Also, the wireless communication may include, for example, local-area communication 164. The local-area communication 164 may include, for example, at least one of wireless-fidelity (Wi-Fi) communication, Bluetooth (BT) communication, near field communication (NFC) communication, or global navigation satellite system (GNSS) communication, and the like. The GNSS may include, for example, at least one of a global positioning system (GPS), a global navigation satellite system (Glonass), a Beidou navigation satellite system (hereinafter referred to as a "Beidou"), or a Galileo (i.e., the European global satellite-based navigation system) according to an available area or a bandwidth, and the like. Hereinafter, the "GPS" used herein may be interchangeably with the "GNSS". The wired communication may include at least one of, for example, universal serial bus (USB) communication, high definition multimedia interface (HDMI) communication, recommended standard 232 (RS-232) communication, or plain old telephone service (POTS) communication, and the like. The network 162 may include a telecommunications network, for example, at least one of a computer network (e.g., a local area network (LAN) or a wide area network (WAN)), the Internet, or a telephone network.

Each of the first and second external electronic devices 102 and 104 may be the same as or different device from the electronic device 101. According to an embodiment, the server 106 may include a group of one or more servers. According to various embodiments, all or some of operations executed in the electronic device 101 may be executed in another electronic device or a plurality of electronic devices (e.g., the first external electronic device 102, the second external electronic device 104, or the server 106). According to an embodiment, if the electronic device 101 should perform any function or service automatically or according to a request, it may request another device (e.g., the first external electronic device 102, the second external electronic device 104, or the server 106) to perform at least part of the function or service, rather than executing the function or service for itself or in addition to the function or service. The other electronic device (e.g., the first external electronic device 102, the second external electronic device 104, or the server 106) may execute the requested function or the added function and may transmit the executed result to the electronic device 101. The electronic device 101 may process the received result without change or additionally and may provide the requested function or service. For this purpose, for example, cloud computing technologies, distributed computing technologies, or client-server computing technologies may be used.

Figure 2:
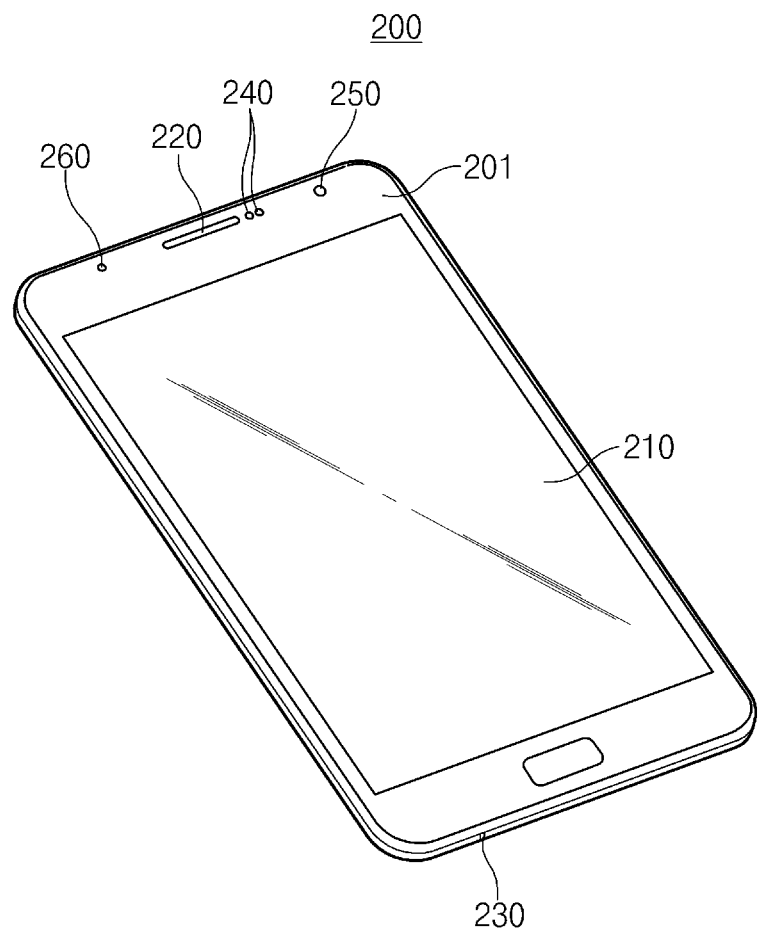
FIG. 2 is a perspective view illustrating an example electronic device according to an example embodiment of the present disclosure.

FIG. 2 is a perspective view illustrating an example electronic device 200 according to various example embodiments of the present disclosure. The electronic device 200 of FIG. 2 may correspond to an electronic device 101 of FIG. 1. The electronic device 200 may be referred to, for example, as a mobile terminal.

Referring to FIG. 2, a display 210 may be arranged on a front surface 201 of the electronic device 200. For example, a speaker device 220 (e.g., a receiver) for outputting a voice of a counterpart upon making a call with the counterpart may be arranged at an upper side of the display 210. A microphone device 230 for obtaining a voice of a user of the electronic device 200 may be installed at a lower side of the display 210.

According an example embodiment, components for performing various functions of the electronic device 200 may be arranged in the periphery where the speaker device 200 is installed. The components may include at least one sensor module 240. This sensor module 240 may include, for example, at least one of an illumination sensor (e.g., an optical sensor), a proximity sensor, an infrared sensor, and an ultrasonic sensor. The components may include a camera device 250. According to an example embodiment, the components may include a light emitting diode (LED) indicator 260 for allowing the user to recognize state information of the electronic device 200.

A plurality of electronic devices may connect with each other through wireless or wired communication to operate. For example, a smartphone may be coupled to a wearable device such as a head mounted display (HMD) to provide content. Hereinafter, a description will be given of a situation where the smartphone and the wearable device such as an HMD are coupled to each other to operate.

An HMD wearable device (hereinafter referred to as "HMD device") according to various example embodiments of the present disclosure may be a device which is close to or worn on both eyes of the user and displays an image. The HMD device may provide at least one of a see-through function of providing augmented reality (AR) or a see-closed function of providing virtual reality (VR). The see-through function may refer to a function of providing additional information or additional images as one image in real time while transmitting real external images to both the eyes of the user via a display. The see-closed function may refer to a function of providing only content provided via the display as an image.

Hereinafter, in a description of performing an operation associated with receiving power in the HMD device and supplying power to the HMD device, an electronic device may be interpreted as an external device coupled to the HMD device. Also, a power supply may be interpreted as an external device which supplies power to the HMD device and the electronic device.

Figure 3:
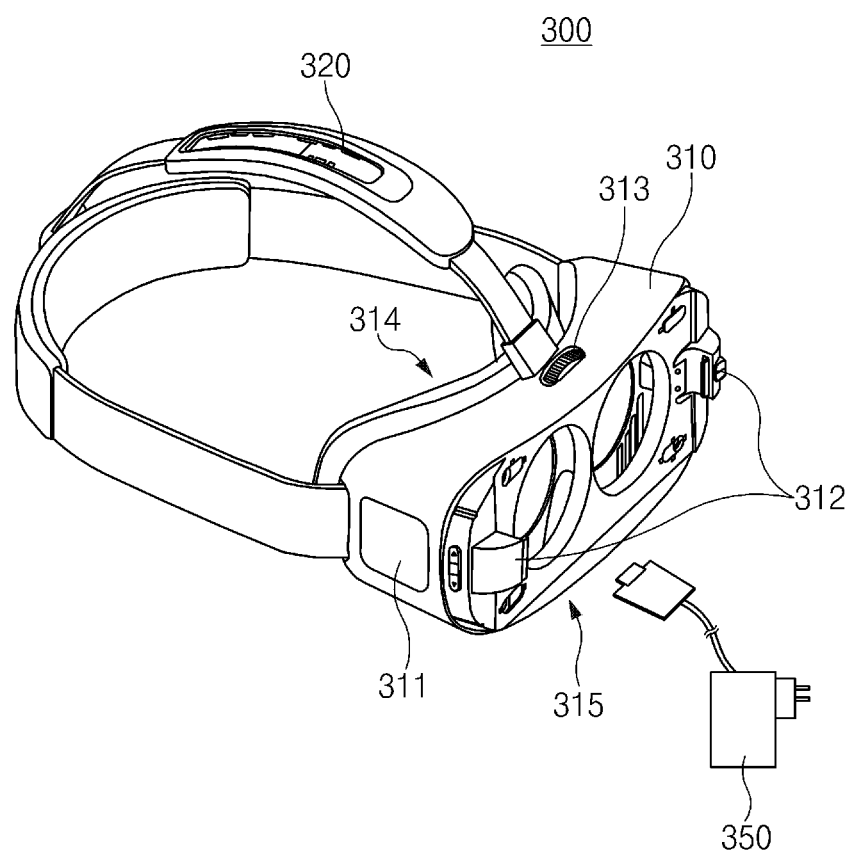
FIG. 3 is a perspective view illustrating an example combination of a head mounted display (HMD) device and an external power supply according to an example embodiment of the present disclosure.

FIG. 3 is a perspective view illustrating an example combination of an HMD device and an external power supply according to an embodiment of the present disclosure.

Referring to FIG. 3, an HMD device 300 may include a main frame 310 configured to be removable from a mobile terminal 200 of FIG. 2 and a mounting part 320 configured to be coupled to the main frame 310 and fix the main frame 310 to part of a body of a user.

The main frame 310 may include a user input module (e.g., including input circuitry) 311 for controlling the mobile terminal 200, a first interface unit (e.g., including interface circuitry) 312 coupled to the mobile terminal 200, a display location adjusting part 313, a proximity sensor 314, and a second interface unit (e.g., including interface circuitry) 315 coupled to an external power supply 350 or another external input device.

According to various example embodiments, the user input module 311 may include various input circuitry, such as, for example, and without limitation, at least one of a physical key, a physical button, a touch key, a joy stick, a wheel key, a touch pad, or the like. If the user input module 311 is a touch pad, the touch pad may be disposed at a side of the main frame 310. The touch pad may include a control object (e.g., a graphical user interface (GUI) of controlling a sound or an image) indicating a function of the mobile terminal 200 or the HMD device 300.

The first interface unit 312 may include various interface circuitry configured to support the HMD device 300 in communicating with the mobile terminal 200. The first interface unit 312 may be connected to an interface unit (e.g., a universal serial bus (USB) port) of the mobile terminal 200 and may send a user input signal generated by the user input module 311 to the mobile terminal 200. For example, the first interface unit 312 may send the user input signal (e.g., a touch input), received from the user input module 311, to the mobile terminal 200. The mobile terminal 200 may perform a function corresponding to the user input signal. For example, the mobile terminal 200 may adjust volume or may reproduce an image in response to the touch input.

The proximity sensor 314 may sense that an object is close thereto, in a non-contact manner and may detect a location of the object. For example, if sensing an object (e.g., part of a body of the user) located within a sensing distance, the proximity sensor 314 may send the sensed signal to a main controller of the HMD device 300. If not sensing any object located within the sensing distance, the proximity sensor 314 may fail to send any signal to the main controller. The main controller may determine that the user wears the HMD device 300, based on a signal sensed by the proximity sensor 314. To easily detect whether the HMD device 300 is worn, the proximity sensor 314 may be disposed at an inner upper portion of the main frame 310 to be close to a forehead of the user when he or she wears the HMD device 300.

Although the proximity sensor 314 is described in an example embodiment of the present disclosure, it is possible to use another sensor for detecting whether the HMD device 300 is worn according to an example embodiment. For example, at least one of an acceleration sensor, a gyro sensor, an earth magnetic field sensor, a gesture sensor, a biometric sensor, a touch sensor, an illumination sensor, or a grip sensor may be mounted on the main frame 310.

The second interface unit 315 may include various interface circuitry and be coupled to the external power supply 350 or the other external input device. For example, if the second interface unit 315 is coupled to the external power supply 350, the HMD device 300 may receive power from the external power supply 350. The received power may be used as an operating power of the HMD device 300, or may be used as an operating power of the mobile terminal 200 or may be used to charge the mobile terminal 200 by being sent to the mobile terminal 200. If the second interface unit 315 is coupled to the external input device, the HMD device 300 may receive an external input signal from the external input device and may send the received external input signal to the main controller of the HMD device 300.

The main frame 310 may be configured to be removable from an external device such as the mobile terminal 200. For example, the main frame 310 may include a space, a structure, or a cavity which may receive the mobile terminal 200. A portion where the space of the main frame 310 is formed may include an elastic material. At least part of the portion where the space of the main frame 310 may be implemented with a flexible material to be modified in size or volume of the space based on devices of various sizes, received in the space.

A rear surface (inner surface) of the main frame 310 may further include a face contact part which is in contact with a face of the user. A lens assembly including at least one lens may be inserted into a location faced with both eyes of the user in part of the face contact part. A display or a transparent/semi-transparent lens in the lens assembly may be integrated with the face contact part and may be implemented to be removable from the face contact part. Part of the face contact part may include a nose recess having a shape into which a nose of the user may be inserted.

In an example embodiment, the main frame 310 may be made of materials which may allow the user to feel a comfortable fit and may support the mobile terminal 200, for example, a plastic material. In another embodiment, the main frame 310 may be made of, for example, at least one of glass, ceramics, metal (e.g., aluminum), or a metal alloy (e.g., steel, stainless steel, titanium, or a magnesium alloy) for strength or beauty.

The mounting part 320 may be worn on part of the body of the user. The mounting part 320 may be made of a band of an elastic material. According to various example embodiments, the mounting part 320 may include eyeglass templates, helmets, straps, or the like.

Figure 4:
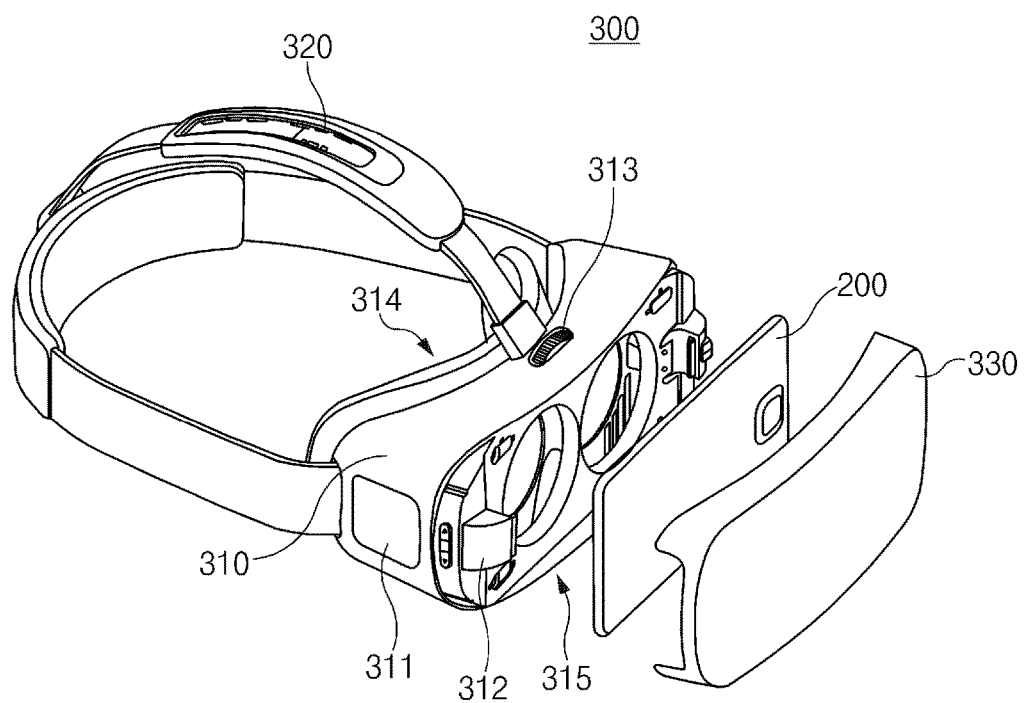
FIG. 4 is a perspective view illustrating an example combination of an HMD device and an electronic device according to an example embodiment of the present disclosure.

FIG. 4 is a perspective view illustrating an example combination of an HMD device and an electronic device according to an example embodiment of the present disclosure.

Referring to FIG. 4, an HMD device 300 may further include a cover 330 for fixing a mobile terminal 200 combined with a main frame 310. The cover 330 may be physically combined with the main frame 310 in the form of a hook and may be combined with the main frame 310 in a manner such as a magnet or an electromagnet. The cover 330 may prevent and/or reduce the ability of the mobile terminal 200 from being removed from a main frame 310 by movement of the user and may protect the mobile terminal 200 from an external impact force.

The main frame 310 and the mobile terminal 200 may be combined such that the main frame 310 is faced with a display of the mobile terminal 200. The user may combine the mobile terminal 200 with the HMD device 300 by combining the mobile terminal 200 with a first interface unit 312 of the main frame 310 and covering the HMD device 300 with the cover 330.

Figure 5A:
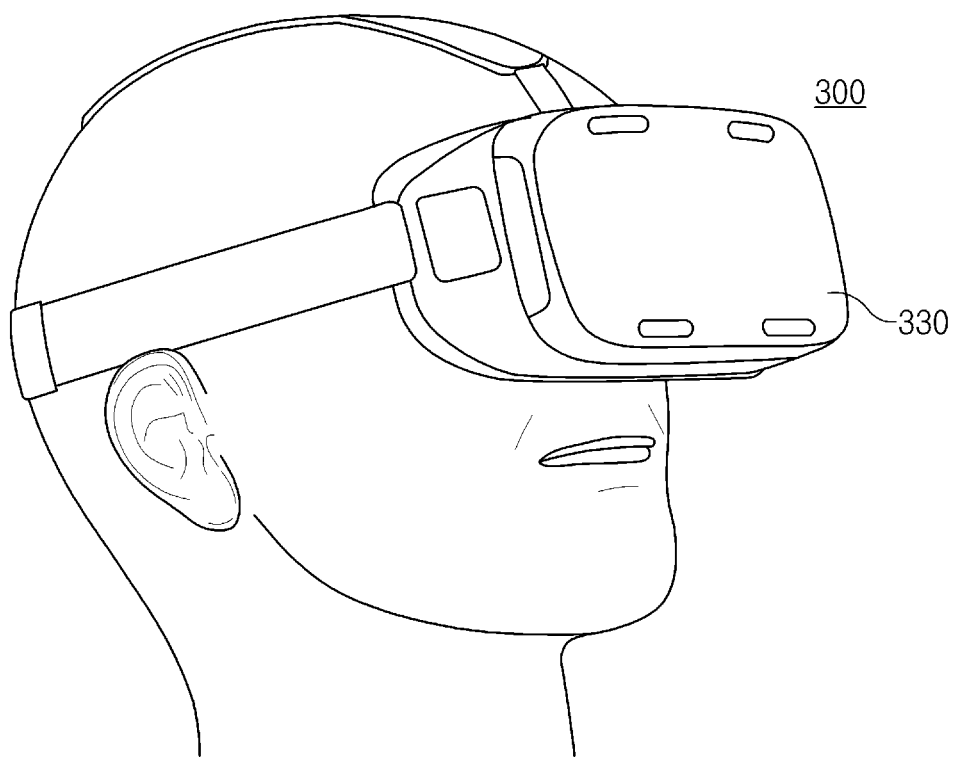
FIG. 5A is a diagram illustrating an example state in which a user wears an HMD device according to an example embodiment of the present disclosure.

FIG. 5A is a diagram illustrating an example state where a user wears an HMD device according to an example embodiment of the present disclosure.

Referring to FIG. 5A, if a user wears an HMD device 300 which is combined with a mobile terminal 200 of FIG. 4 and which is covered with the cover 330, he or she may view a screen of the mobile terminal 200 through the HMD device 300. In this case, the mobile terminal 200 may output a left-eye image and a right-eye image to its display, and the HMD device 300 may process images of the mobile terminal 200 via a lens assembly implemented in a face contact part of a main frame 310 of FIG. 4, such that the user may view the processed image, for example, AR through a see-through function or VR using a see-closed function.

An HMD device may include an untethered VR scheme in which it uses a display of an external electronic device without change and a tethered VR scheme in which it has its own display. A method of driving the mobile terminal 200 and the HMD device 300 may be a method of driving the mobile terminal 200 and the HMD device 300 based on the untethered VR scheme.

The HMD device 300 according to various example embodiments of the present disclosure may include the tethered VR scheme. The HMD device 300 according to the tethered VR scheme may include a display which may reproduce content. Thus, the HMD device 300 according to the tethered VR scheme may reproduce content without be mechanically combined with the above-mentioned mobile terminal 200. For example, the HMD device 300 according to the tethered VR scheme may receive high definition image data generated by the mobile terminal 200 via its connector and may output an image on its display (e.g., perform mirroring).

The HMD device 300 according to the tethered VR scheme and the mobile terminal 200 may be coupled to each other via various image communication interfaces. For example, the image data may follow standards of image communication interfaces such as a high definition multimedia interface (HDMI), a mobile high-definition link (MHL) interface, a displayport interface, and a universal serial bus (USB) audio video device interface and may follow standards autonomously written by each manufacturer.

The image data may be sent to the HMD device 300 via the connector. For example, data terminals such as a receive (Rx) pin and a transmit (Tx) pin of a USB Type-C connector may be used for transmitting image data. In an example embodiment of the present disclosure, types of a wired communication interface and a connector used by the HMD device 300 and the mobile terminal 200 is not limited to any type.

In an example embodiment of the present disclosure, an electronic device which may be mechanically or electrically coupled to the mobile terminal 200 to operate is not limited to the HMD device 300. The mobile terminal 200 may interwork with various electronic devices. For example, the mobile terminal 200 may be combined with a multimedia dock to operate.

Figure 5B:
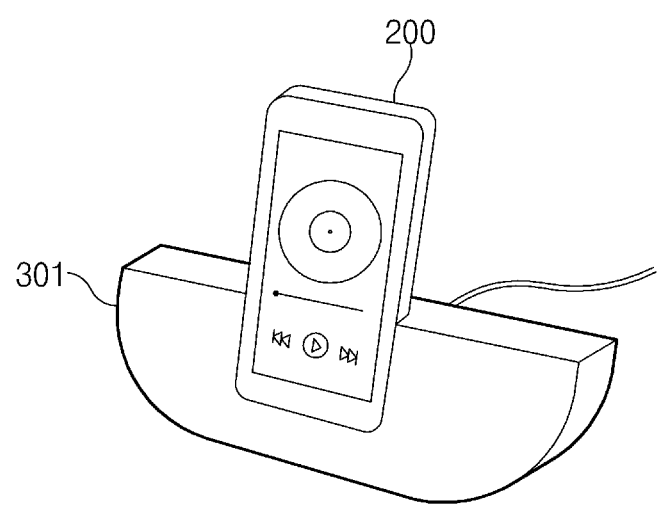
FIG. 5B is a diagram illustrating an example state where a multimedia dock is attached to a mobile terminal according to an example embodiment of the present disclosure.

FIG. 5B is a diagram illustrating an example state where a multimedia dock is attached to a mobile terminal 200 according to an example embodiment of the present disclosure.

Referring to FIG. 5B, the mobile terminal 200 may be coupled to a multimedia dock 301. The multimedia dock 301 and the mobile terminal 200 may communicate content by being coupled to each other via a wired communication interface. For example, the multimedia dock 301 may receive content from the mobile terminal 200 and may reproduce the received content via a speaker (not shown). The multimedia dock 301 may include a display (not shown) and may reproduce image data transmitted from the mobile terminal 200. Also, the multimedia dock 301 may be coupled to the mobile terminal 200 via its connector to supply power to the mobile terminal 200. In an example embodiment of the present disclosure, types of a wired communication interface and a connector used by the multimedia dock 301 and the mobile terminal 200 are not limited to any one type.

Figure 6:
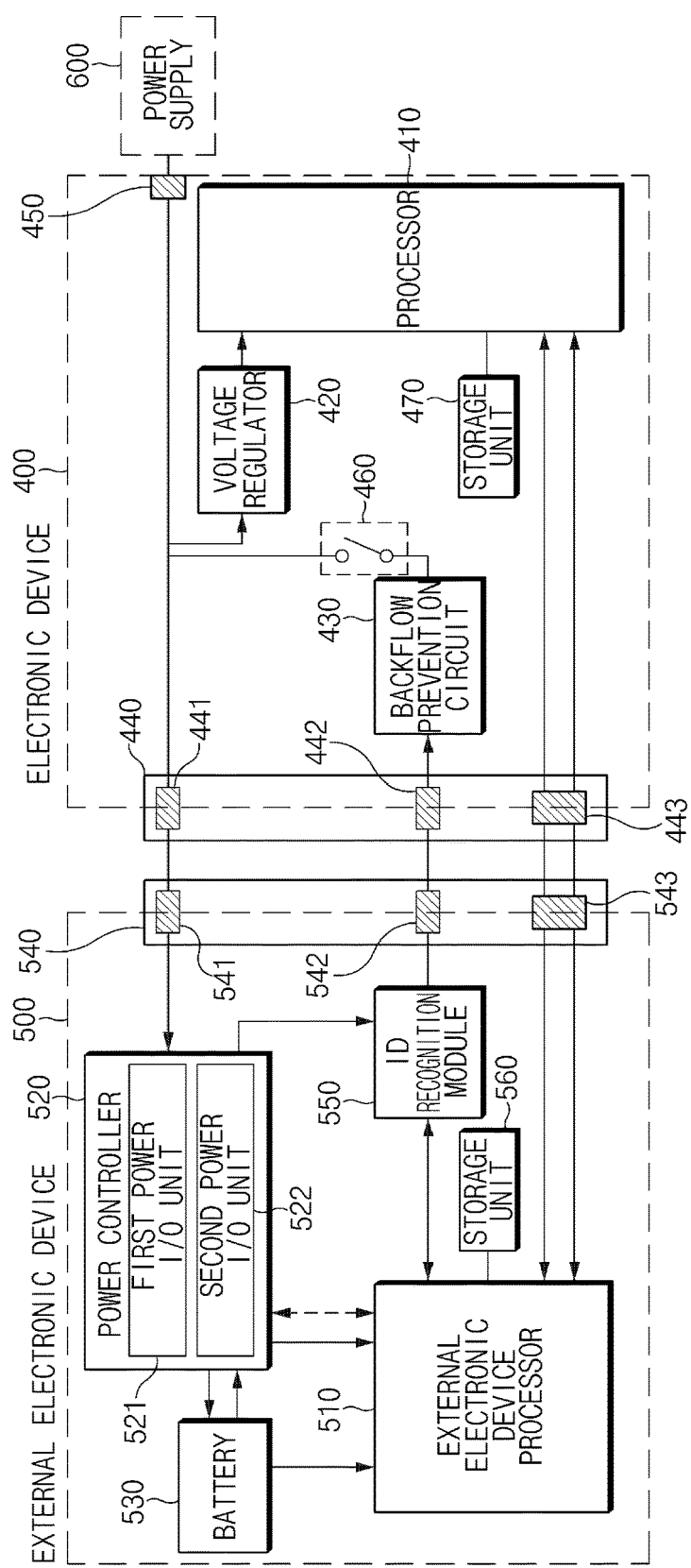
FIG. 6 is a block diagram illustrating an example situation in which an electronic device interworks with a first external electronic device and a second external electronic device according to an example embodiment of the present disclosure.

FIG. 6 is a block diagram illustrating an example situation where an electronic device interworks with a first external electronic device and a second external electronic device according to an example embodiment of the present disclosure.

An electronic device 400 may correspond to an accessory device operatively connected with an external electronic device 500. In the description, the external electronic device 500 may be referred to as a first external electronic device. The electronic device 400 may correspond to, for example, an HMD device 300 of FIG. 4 or a multimedia dock 301 of FIG. 5B. However, the electronic device 400 according to an example embodiment of the present disclosure is not limited thereto. Also, for example, the electronic device 400 may be distinctively shown from the external electronic device 500, but the electronic device 400 and the external electronic device 500 may be implemented as one device. For example, the external electronic device 500 may be located at least part of the electronic device 400 or may be configured in the electronic device 400.

The external electronic device 500 may be operatively connected with the electronic device 400. For example, the external electronic device 500 may be a smartphone. However, the external electronic device 500 according to an example embodiment of the present disclosure is not limited to a smartphone. For example, the external electronic device 500 may include a mobile terminal such as a tablet personal computer (PC) or a personal digital assistants (PDA), or the like.

A power supply 600 may include an auxiliary accessory device electrically connected with the electronic device 400. For example, the power supply 600 may be a charging device which may supply power. The charging device may include, for example, a laptop computer, a travel adaptor (TA), an auxiliary battery, or the like.

The electronic device 400 and the external electronic device 500 may be connected with each other via a wired communication interface. According to various example embodiments, the electronic device 400 and the external electronic device 500 may are connected with each other via an image communication interface (e.g., an HDMI, a displayport interface, an MHL interface, a USB audio video device interface, or the like). The electronic device 400 may be a source device which generates content data (e.g., image data) and the external electronic device 500 may operate as a sink device which receives content and outputs or reproduces the received content, and the vice versa. According to various example embodiments, the electronic device 400 and the external electronic device 500 may be connected with each other via a USB communication interface. The external electronic device 500 may operate as a USB host and the electronic device 400 may operate as a USB client, and the vice versa.

The electronic device 400 and the external electronic device 500 may be connected with each other via their connectors. The connectors may transmit analog or digital data to the inside and outside of the electronic device 400 and the external electronic device 500. The connectors may transmit power to the inside and outside of the electronic device 400 and the external electronic device 500. According to various example embodiments, each of the connectors may be a USB Type-C connector. The electronic device 400 and the external electronic device 500 may transmit data and power with each other via the USB Type-C connector. According to various example embodiments, the electronic device 400 and the external electronic device 500 may be connected with each other in an alternate mode, when connected via the USB Type-C connector. For example, an image signal of an image communication interface (e.g., a video electronics standards association (VESA) displayport interface) may be transmitted or received via a USB connector.

In an example embodiment of the present disclosure, types of the wired communication interface and the connector used by the electronic device 400 and the external electronic device 500 are not limited to any one type.

If elastically connected with the external electronic device 500, the electronic device 400 may receive power from the external electronic device 500. For example, the electronic device 400 may receive power from the external electronic device 500 via a power port of its connector (e.g., a VBUS pin of a USB connector). The electronic device 400 may be driven using power supplied from the external electronic device 500.

If electrically connected with the power supply 600, the electronic device 400 may receive power from the power supply 600. In this case, the electronic device 400 may be driven using the power supplied from the power supply 600 and may request the external electronic device 500 to stop supplying power. For example, when detecting a connection with the power supply 600, the electronic device 400 may send state information for providing notification that the power supply 600 is connected with the electronic device 400 to the external electronic device 500.

According to an example embodiment, the state information may be transmitted to the external electronic device 500 via a data communication port of the connector (e.g., a D+ pin and a D– pin, a receive (Rx) pin and a transmit (Tx) pin, a configuration channel (CC) pin, or the like) of the USB connector. The data communication port may include, for example, a plus data communication port (D+) and a minus data communication port (D–) of a USB interface. According to another example embodiment, the state information may be transmitted to the external electronic device 500 via a port (e.g., a port similar to an ID port of a micro USB connector) which transmits a variable resistor signal of the connector.

If electrically connected with the power supply 600, the electronic device 400 may supply power to the external electronic device 500. For example, the electronic device 400 may supply power to the external electronic device 500 via a power port (e.g., a VBUS pin) of a USB interface. The external electronic device 500 may be driven using the power supplied from the electronic device 400.

The state information may be of a data type corresponding to a USB device class for communicating with, for example, a keyboard, a mouse, a touch sensor, a VR sensor, an audio or video device, and the like. In this case, the state information may be generated as one of a key value, a mouse coordinate value, a touch coordinate value, a VR sensor value, or an audio or video device control signal value. For example, in case of using a keyboard device class, if detecting a connection of the power supply 600, the electronic device 400 may generate a key value (e.g., "0×2fd" or "0×2fe") corresponding to a key as state information as the key is pushed and may send the generated key value to the external electronic device 500 via a data communication port.

The state information may have different values if the power supply 600 is connected to the electronic device 400 in a state where the electronic device 400 and the external electronic device 500 are connected with each other and if the external electronic device 500 is connected to the electronic device 400 in a state where the electronic device 400 and the power supply 600 are connected with each other. For example, if the power supply 600 is connected to the electronic device 400 in the state where the electronic device 400 and the external electronic device 500 are connected with each other, the state information may be "0×2fd". If the external electronic device 500 is connected to the electronic device 400 in the state where the electronic device 400 and the power supply 600 are connected with each other, the state information may be "0×2fe".

The electronic device 400 and the external electronic device 500 may communicate information with each other via an ID port of a connector to identify each other. According to various example embodiments of the present disclosure, the state information may be of, for example, a type of data to be transmitted via the ID port of the connector.

According to an example embodiment, the connector may include an ID port (e.g., a configuration channel (CC) pin of a USB Type-C connector) for supporting a 'digital ID' scheme. In various example embodiments of the present disclosure, the state information may be of a type of data which may be communicated via a digital ID port included in the connector.

According to another example embodiment, the connector may include an ID port (e.g., an ID port of a micro USB connector) for supporting a 'resistor ID' scheme. In various example embodiments of the present disclosure, the state information may be of a type of data transmitted in such a manner as to change a resistance value via a 'resistor ID' port included in the connector.

Part of power supplied from the power supply 600 may be used to drive the electronic device 400, and the rest of the power may be supplied to the external electronic device 500 via the above-mentioned power port. For example, the external electronic device 500 may drive the external electronic device 500 and may charge a battery 530 electrically connected with the external electronic device 500, using power of the power supply 600, supplied via the electronic device 400.

As such, the electronic device 400 according to an example embodiment of the present disclosure may send state information indicating that the power supply 600 is connected to the electronic device 400 to the external electronic device 500 through data communication (e.g., software information) without an additional component (e.g., a hardware device).

The electronic device 400, the external electronic device 500, and the power supply 600 may be connected via various communication interfaces. For example, the electronic device 400 may include an HDMI, an optical interface, a D-subminiature (D-sub), or a lightning port, and may be connected with the external electronic device 500 or the power supply 600 based on at least one of the HDMI, the optical interface, the D-sub, or the lightning port.

The electronic device 400 may include a processor (e.g., including processing circuitry) 410, a voltage regulator 420, a backflow prevention circuit 430, a first connector 440, a second connector 450, a first switch 460, and/or a storage unit 470. Also, the electronic device 400 may further include, for example, a connection sensing circuit (not shown).

The processor 410 may include various processing circuitry configured to control an operation of the electronic device 400 and/or signal flow between blocks of the electronic devices 400 and may perform a data processing function of processing data. For example, the processor 410 may include various processing circuitry, such as, for example, and without limitation, a dedicated processor, a central processing unit (CPU), an application processor (AP), a micro controller unit (MCU), a microprocessor unit (MPU), or the like. The processor 410 may be configured with a single core processor or a multi-core processor.

The processor 410 may notify the external electronic device 500 that a state of the electronic device is changed, for example, that the power supply 600 is removed from the electronic device 400. For example, if the power supply device 600 and the electronic device 400 are disconnected from each other, the processor 410 may recognize that the power supply device 600 and the electronic device 400 are disconnected from each other, through an interrupt signal line coupled to the second connector 450. In this case, the processor 410 may communicate with the external electronic device 500 to notify the external electronic device 500 that the state of the electronic device 400 is changed. Also, if the power supply 600 and the electronic device 400 are connected with each other, the processor 410 may recognize that the power supply 600 and the electronic device 400 are connected with each other, through the interrupt signal line coupled to the second connector 450. In this case, the processor 410 may close the first switch 460 and may communicate with the external electronic device 500 to notify the external electronic device 500 that the state of the electronic device 400 is changed.

The voltage regulator 420 may control a voltage of power supplied to each of the components included in the electronic device 400. The voltage regulator 420 may output voltage (e.g., 3.0 V). For example, the voltage regulator 420 may include a low drop-out voltage regulator (LDO).

The voltage regulator 420 may receive power of the external electronic device 500 or the power supply 600 and may output the voltage (e.g., 3.0 V). For example, if the electronic device 400 is connected with only the external electronic device 500 without being connected with the power supply 600, the voltage regulator 420 may receive power supplied via a power port 441 (e.g. a VBUS pin) of the first connector 440 and may output the voltage. Also, if the power supply 600 is connected to the electronic device 400, the voltage regulator 420 may receive power supplied from the power supply 600 via the second connector 450 and may output the voltage.

The backflow prevention circuit 430 may play a role in transmitting power input via a second power port 442 of the first connector 440 to the voltage regulator 420 of the electronic device 400 and preventing power input via a first power port 441 of the first connector 440 or the second connector 450 from being transmitted to the second power port 442 of the first connector 440. The backflow prevention circuit 430 may include a diode.

The storage unit 470 may store an operating system (OS) of the electronic device 400 and application programs necessary for other option functions, for example, an audio playback function, an image or video playback function, and the like. The storage unit 470 may correspond to a memory 130 of FIG. 1.

The storage unit 470 may store a variety of information and programs necessary for controlling a power management method according to an example embodiment of the present disclosure. For example, the program may include a routine of detecting a connection of the power supply 600, a routine of controlling ON/OFF of the first switch 460 based on whether the power supply 600 is connected with the electronic device 400, a routine of generating state information for providing notification that the power supply device 600 is connected with the electronic device 400, or the like.

The first connector 440 may include a device for being operatively connected with the external electronic device 500. The first connector 440 may include the first power port 441 for supplying or receiving power, the second power port 442 for transmitting power to the external electronic device 500 and/or a cable coupled to the first connector 440, a data communication port 443 for data communication with the external electronic device 500, and/or a ground terminal (not shown). The arrangement of the first power port 441, the second power port 442, the data communication port 443, and the like is not limited to FIG. 6, and modifications are possible according to a characteristic of the electronic device 400. The first power port 441 may be referred to as a first pin. The second power port 442 may be referred to as a second pin. The data communication port 443 may be referred to as a third pin.

According to various example embodiments of the present disclosure, the first connector 440 may have a standard of a USB connector. In this case, the first power port 441 may correspond to a VBUS pin of the USB connector. The second power port 442 may correspond to a V_CONN pin (or a second VBUS pin). The data communication port 443 may correspond to a D+ pin and a D– pin or a Tx pin and an Rx pin.

The first power port 441 may receive power transmitted from the external electronic device 500 and may transmit power, transmitted from the power supply 600, to the external electronic device 500. The second power port 442 may receive power transmitted from the external electronic device 500.

The data communication port 443 may include, for example, the D+ pin and the D– pin and/or a Tx+/Tx– pin and an Rx+/Rx– pin. Various port names may be used based on a connector. The electronic device 400 may communicate information with the external electronic device 500 via the data communication port 443.

The second connector 450 may include a device for being electrically connected with the power supply 600. The second connector 450 may include a port for receiving power, a port for detecting a connection with the power supply 600, and/or a ground port. The second connector 450 may further include a port for identifying a type of the power supply 600. Similar to the first connector 440, the second connector 450 may include a standard of the USB connector. Thus, the second connector 450 may perform a similar configuration and operation to the above-mentioned first connector 440.

The connection sensing circuit (not shown) may verify whether an external electronic device (e.g., the power supply 600) coupled to the first pin is removed from the electronic device 400 via the second connector 450. For example, the connection sensing circuit may verify whether the power supply 600 is connected or disconnected from the electronic device 400 via the second connector 450. Also, the connection sensing circuit may send information associated with a connection or disconnection of the power supply 600 to the processor 410.

Meanwhile, although not illustrated in FIG. 6, the electronic device 400 according to an example embodiment of the present disclosure may optionally further include components such as an input module (e.g., a touch pad, a button key, and a touch key), a digital sound source playback module, various sensor modules (e.g., an infrared sensor module and an illumination sensor module), and a display module. Also, the electronic device 400 according to an example embodiment of the present disclosure may further include the same components as the above-mentioned components.

The external electronic device 500 may include an external electronic device processor (e.g., including processing circuitry) 510, a power controller 520, a battery 530, a connector 540, an identifier (ID) recognition module (e.g., including identifier circuitry) 550, and/or a storage unit 560.

The connector 540 may include a device for being operatively connected with the electronic device 400. The connector 540 may include a first power port 541 for supplying or receiving power, a second power port 542 for transmitting power to an external electronic device and/or a cable coupled to the connector 540, a data communication port 543 for data communication with the electronic device 400, and/or a ground terminal (not shown). In the description, the first power port 541 may be referred to as a first pin. The second power port 542 may be referred to as a second pin. The data communication port 543 may be referred to as a third pin.

According to various example embodiments of the present disclosure, the connector 540 may have the standard of the USB connector. In this case, the first power port 541 may correspond to a VBUS pin of the USB connector. The second power port 542 may correspond to a V_CONN pin (or a second VBUS pin). The data communication port 543 may correspond to a D+ pin and a D− pin or a Tx pin and an Rx pin.

The first power port 541 may receive power transmitted from the power supply 600 via the electronic device 400. The second power port 542 may transmit power to the electronic device 400.

The data communication port 543 may include, for example, the D+ pin and the D− pin and/or a Tx+/Tx− pin and an Rx+/Rx− pin. Various port names may be used based on a connector. The external electronic device 500 may communicate information with the electronic device 400 via the data communication port 543.

The battery 530 may supply power to each of the components included in the external electronic device 500. The battery 530 may be, for example, a rechargeable battery. The battery 530 may be, for example, a battery electrically connected to the external electronic device 500, an embedded battery embedded in the external electronic device 500, or a removable battery which is detachable by a user of the external electronic device 500.

The storage unit 560 may store an operating system (OS) of the external electronic device 500 and application programs necessary for other option functions, for example, an audio playback function, an image or video playback function, and the like. The storage unit 560 may correspond to the memory 130 of FIG. 1.

The power controller 520 may manage power supplied to the external electronic device 500. The power controller 520 may include a power management integrated circuit (PMIC) (not shown), a voltage regulator (not shown), first and second power input/output (I/O) units 521 and 522, a charger IC (not shown). Also, the power controller 520 may include various power controller circuitry that play a role of controlling power and regulating voltage through combinations of various ICs, various circuits, and a variety of software. For example, the first power I/O unit 521 is implemented with a module independent of the second power I/O unit 522.

If the electronic device 400 and the power supply 600 are connected with each other, the power controller 520 may receive power from the power supply 600 via the first power port 541 of the connector 540. Also, if the electronic device 400 and the power supply 600 are disconnected from each other, the power controller 520 may supply power to the electronic device 400 via the first power port of the connector 540.

As described above, the power controller 520 may supply power of the battery 530 to the electronic device 400 or may charge the battery 530 with power supplied from the outside, in response to a state of the external electronic device 500. According to an example embodiment of the present disclosure, if receiving power via the electronic device 400, the power controller 520 may be configured to supply power to the electronic device 400 via the second power port 542 of the connector 540.

The external electronic device processor 510 may include various processing circuitry configured to control an overall operation of the external electronic device 500 and signal flow between internal blocks of the external electronic device 500 and may perform a data processing function of processing data. For example, the external electronic device processor 510 may include various processing circuitry, such as, for example, and without limitation, a dedicated processor, a CPU, an AP, or the like. The external electronic device processor 510 may be configured with a single core processor or a multi-core processor. The external electronic device processor 510 may be configured with a plurality of processors.

The external electronic device processor 510 may receive notification that the power supply device 600 is connected or disconnected from the electronic device 400, from the electronic device 400. The external electronic device processor 510 may control an operation of the above-mentioned power controller 520 based on the notification.

The ID recognition module 550 may be coupled to the second power port 542 (e.g., an ID port) of the connector 540, may determine what an external device connected to the connector 540 is, and may send information about the external device to the external electronic device processor 510. As illustrated, the ID recognition module 550 may include various circuitry and be implemented in the form of a chip independent of the external electronic device processor 510, or may be implemented to be included in part of the external electronic device processor 510.

For example, in case of a USB Type-C connector, the ID port 542 may correspond to a CC pin, and the ID recognition module 550 may correspond to a configuration channel integrated circuit (CCIC). The USB connector may have two CC pins. For example, the CCIC (corresponding to the ID recognition module 550 in FIG. 6) may determine directionality of a cable connected to the connector 540. One of the two CC pins may be used for transmitting power to a cable (or an external electronic device), and the other of the two CC pins may be used for communicating with a counterpart device connected via the cable, determining what a device connected to the connector 540 is, and managing the connection.

The second power port 542 may be a path for supplying part of power to the electronic device 400. In another example embodiment, a power line connected to the second power port 542 may be configured not to pass the CCIC 550. For example, the external electronic device 500 may be configured to directly connect the second power I/O unit 522 with the second power port 542.

In FIG. 6, an example embodiment is exemplified as the ID port and the second power port are implemented as the same port 542, but the ID port and the second power port may be implemented as ports independent of each other. In this case, the second power I/O unit 522 may be connected to the second power port without passing the ID recognition module 550.

In various example embodiments of the present disclosure, the ID recognition module 550 may be implemented to be omitted. In various example embodiments described with reference to FIG. 6, 9, 11, 13, 15, or 17, the external electronic device 500 may be implemented not to include the ID recognition module 550. The external electronic device 500 may operate in a charging mode, an on the go (OTG) mode, or a power path mode based on control of the external electronic device processor 510.

The charging mode may be a mode of charging the battery 530 using power input from the outside. For example, the external electronic device 500 may charge the battery 530 with power supplied from the first power port 541 via the first power I/O unit 521 of the power controller 520. According to an embodiment, upon operating in the charging mode, the external electronic device 500 may supply part of power supplied from the outside to the battery 530 via the power controller 520 and may supply the rest of the power to components of another mobile terminal, for example, the external electronic device processor 510, the ID recognition module 550, and the like.

The OTG mode may be a mode where the external electronic device 500 may supply power to various external devices connected via connectable interfaces such as a mouse, a keyboard, and a USB memory. According to an embodiment, if the electronic device 400 is connected to the external electronic device 500, the external electronic device 500 may operate in the OTG mode and may supply power of the battery 530 to the electronic device 400 via the first power port 541.

The power path mode may be a mode where the power controller 520 supplies power input to the external electronic device 500 from the outside via the power controller 520 to components of another mobile terminal without supplying the power to the battery 530. For example, according to an example embodiment, the external electronic device 500 may receive part of power from the power supply 600 electrically connected to the electronic device 400 and may supply the received power to the power controller 520 without supplying the power to the battery 530.

In the above-mentioned three modes, the second power I/O unit 522 of the external electronic device 500 may supply power stored in the battery 530 to the electronic device 400 via the second power port 542. According to an example embodiment, if the power supply 600 and the electronic device 400 are disconnected from each other, power supplied from the external electronic device 500 to the electronic device 400 via the second power port 542 may be used to maintain power of the electronic device 400.

Power supplied to the second power port 442 of the electronic device 400 may not be supplied to the voltage regulator 420 of the electronic device 400. For example, the electronic device 400 may boost power supplied from the power supply 600, may transmit the boosted power to the voltage regulator 420, and may transmit the boosted power to the external electronic device 500 via the first power port 441. Thus, power supplied via the second power port 442 may not be supplied to the voltage regulator 420 of the electronic device 400 by a voltage difference.

The electronic device 400 may further include the backflow prevention circuit 430. The backflow prevention circuit 430 may transmit power input via the second power port 442 to the voltage regulator 420 of the electronic device 400. However, as described above, power input via the second power port 442 may not be supplied to the voltage regulator 420 by a voltage difference. Meanwhile, the backflow prevention circuit 430 may play a role in preventing power input via the first power port 441 of the first connector 440 or the second connector 450 from being transmitted to the second power port 442 of the first connector 440.

The electronic device 400 according to an example embodiment of the present disclosure may not include the first switch 460. For example, if the above-mentioned voltage difference occurs in the electronic device 400, since it is unnecessary to prevent power leakage via the second power port 442, the electronic device 400 may be configured not to include the first switch 460.

According to another example embodiment, the power controller 520 of the external electronic device 500 may more drop and transmit voltage for power output to the second power port 542 than power input to the external electronic device 500. Also, a voltage regulator may be additionally installed between the second power I/O unit 522 and the second power port 542 in the external electronic device 500 to drop and transmit voltage.

By the above-mentioned configuration, in a state where the power supply 600 is connected with the electronic device 400, power input to the second power port 442 may not be supplied to the voltage regulator 420 of the electronic device 400.

If the power supply 600 is disconnected from the electronic device 400, power supplied from the power supply 600 may disappear. If recognizing that the power supplied from the power supply 600 disappears, the external electronic device 500 may start to supply power to the electronic device 400 via the first power port 540. However, the electronic device 400 may fail to receive power from the power supply 600 and the first power port 441 connected with the external electronic device 500, between a time when the external electronic device 500 recognizes that the power disappears and a time when the external electronic device 500 starts to supply the power. In this case, the electronic device 400 may receive power via the second power port 442 connected with the second power port 542 of the external electronic device 500 and may maintain power of the electronic device 400. For example, if the power supply 600 is disconnected from the electronic device 400, since the voltage difference which prevents an inflow of power via the second power port 442 is resolved (or reversed), the electronic device 400 may maintain its power using power supplied via the second power port 442.

Hereinafter, a detailed description will be given of a method for maintaining power of the electronic device 400 in a situation where the electronic device 400 fails to receive power after it is disconnected from the power supply 600.

Figure 7A:
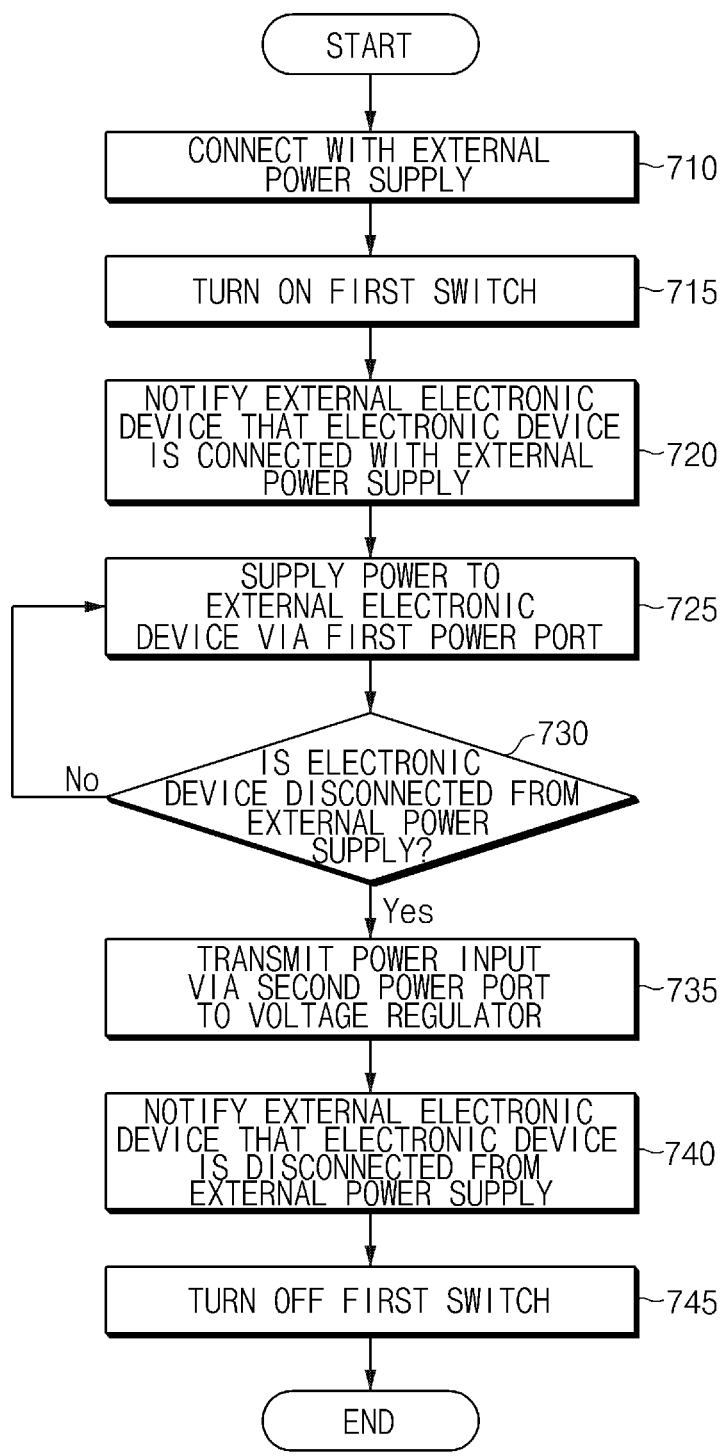
FIGS. 7A and 7B are flowcharts illustrating an example operation where power supply is interrupted while an electronic device receives power from a power supply according to an example embodiment of the present disclosure.

FIG. 7A is a flowchart illustrating an example operation where power supply is interrupted while an electronic device receives power from a power supply according to an example embodiment of the present disclosure.

In operation 710, an electronic device 400 (e.g., a processor 410) of FIG. 6 may recognize that it is electrically connected with a power supply 600 of FIG. 6. In operation 715, the electronic device 400 (e.g., the processor 410) may change a first switch 460 of FIG. 6 to an ON state such that power input via the second power port 442 is supplied to a point on an electronic path of connecting a first power port 441 of FIG. 6 with a second connector 450 of FIG. 6.

In operation 720, the electronic device 400 (e.g., the processor 410) may transmit notification that it is connected with the power supply 600 to an external electronic device 500 of FIG. 6. According to various example embodiments, the electronic device 400 and the external electronic device 500 may communicate the notification using data communication ports 443 and 543 of FIG. 6. According to various example embodiments, the electronic device 400 and the external electronic device 500 may communicate the notification via the ID port 542. The electronic device 400 and the external electronic device 500 may communicate the notification using a port for transmitting a variable resistance value.

In operation 725, the electronic device 400 (e.g., the processor 410) may supply power to the external electronic device 500 via the first power port 441. For example, if transmitting notification that power is supplied to the external electronic device 500 to the external electronic device 500, the external electronic device 500 may draw power from the electronic device 400.

In operation 730, the electronic device 400 (e.g., the processor 410) may determine whether it is disconnected from the power supply 600. In operation 735, power supplied via a second power port 442 of FIG. 6 may be supplied to a voltage regulator 420 of FIG. 6 at the substantially same time that the electronic device 400 is disconnected from the power supply 600. As described above, as power supplied from the power supply 600 disappears, power which is not supplied to the voltage regulator 420 by a voltage difference may be supplied to the voltage regulator 420. If not disconnected from the power supply 600, the electronic device 400 may receive power from the power supply 600 to transmit the received power to the voltage regulator 420 and may receive power input via the second power port 442.

In operation 740, the electronic device 400 (e.g., the processor 410) may notify the external electronic device 500 that it is disconnected from the power supply 600. However, in an example embodiment, the external electronic device 500 may know that the electronic device 400 is disconnected from the power supply 600, based on recognizing that power input via the electronic device 400 is not supplied to the external electronic device 500.

In operation 745, the electronic device 400 (e.g., the processor 410) may turn off the first switch 460 to interrupt power supplied from the second power port 442 and may maintain a power state using power supplied via the first power port 441.

Figure 7B:
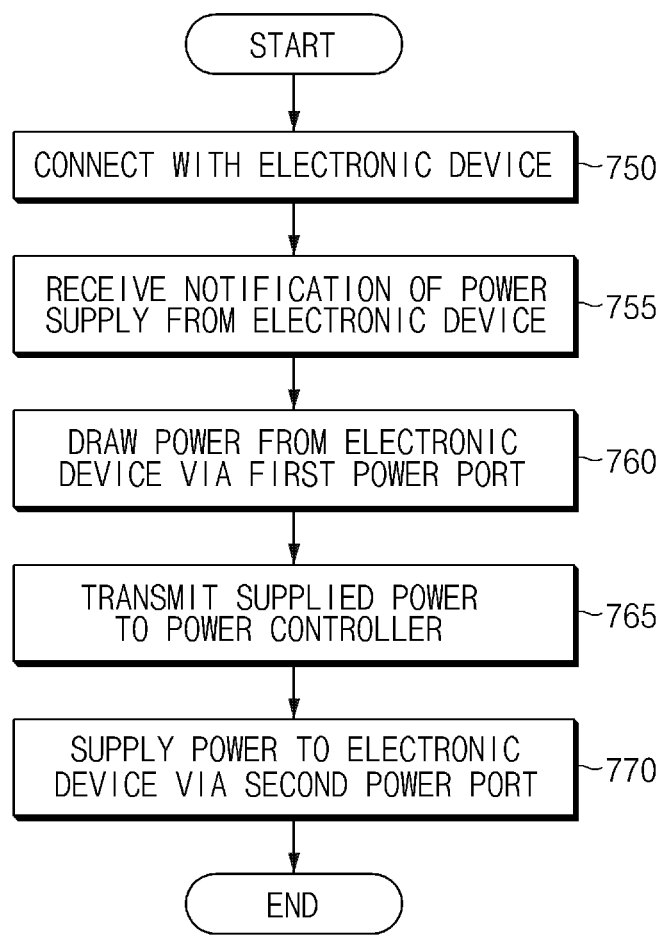

FIG. 7B is a flowchart illustrating an example operation where an external electronic device is connected with an electronic device to receive power according to an example embodiment of the present disclosure.

In operation 750, an external electronic device 500 of FIG. 6 may recognize that it is electrically connected with an electronic device 400 of FIG. 6. In operation 755, the external electronic device 500 may receive notification that power is supplied to the external electronic device 500 from the electronic device 400.

In operation 760, the external electronic device 500 may draw power in the electronic device 400 via a first power port 541 of FIG. 6 based on the notification of the electronic device 400. In operation 765, the external electronic device 500 may transmit supplied power to a power controller 520 of FIG. 6. The external electronic device 500 may drive its components using power supplied to the power controller 520 or may store power in a battery 530.

In operation 770, the external electronic device 500 may control the power controller 520 to supply power to the electronic device 400 via a second power port 542 of FIG. 6. The power controller 520 may supply, for example, power stored in the battery 530 to the electronic device 400 via the second power port 542.

Figure 8:
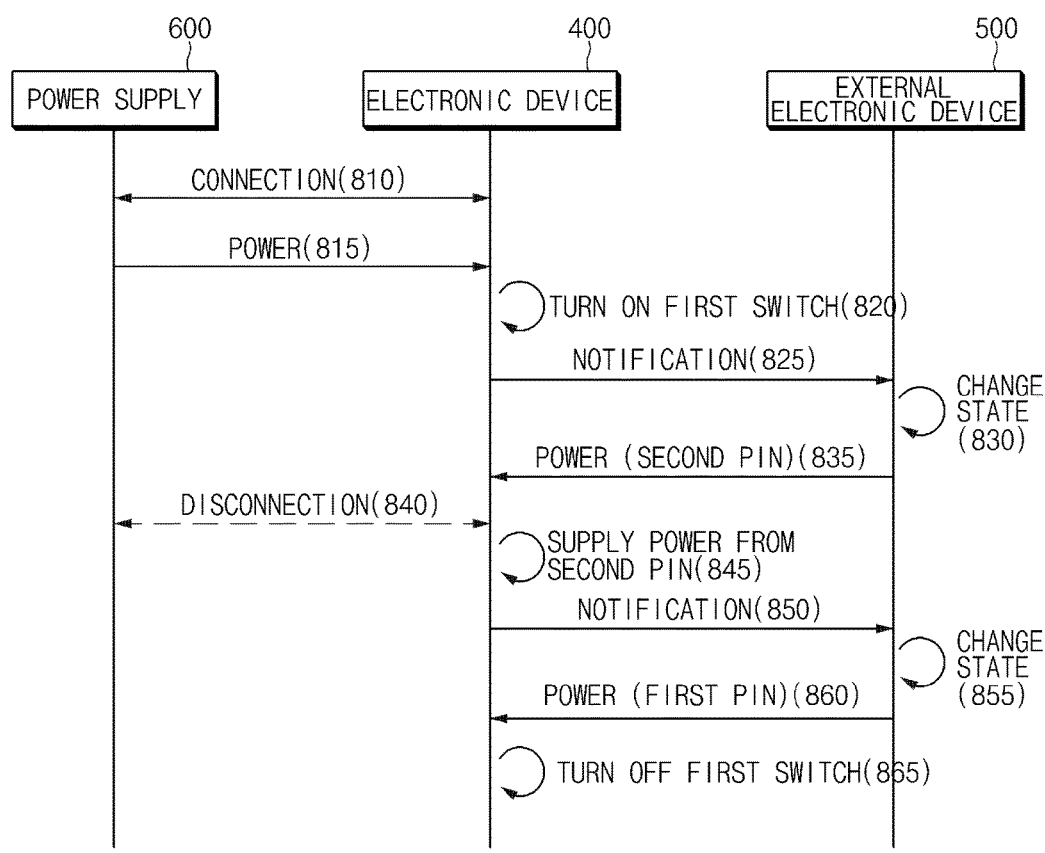
FIG. 8 is a signal sequence diagram illustrating an example operation where an electronic device and a power supply are connected or disconnected from each other according to an example embodiment of the present disclosure.

FIG. 8 is a signal sequence diagram illustrating an example operation where an electronic device and a power supply are connected or disconnected from each other according to an example embodiment of the present disclosure.

Referring to FIG. 8, in operation 810, an electronic device 400 and a power supply 600 are electrically connected with each other. In operation 815, the power supply 600 may supply power to the electronic device 400. The electronic device 400 may maintain its power-on state using the power supplied from the power supply 600. In operation 820, the electronic device 400 (e.g., a processor 410 of FIG. 6) may turn on a first switch 460 of FIG. 6 to connect at least part of a power line coupled to the power supply 600 to a first power port 441 of FIG. 6.

In operation 825, the electronic device 400 (e.g., the processor 410) may send notification that it is connected with the power supply 600 to an external electronic device 500. The electronic device 400 and the external electronic device 500 may communicate the notification using a port of a connector (e.g., data communication ports 443 and 543 of FIG. 6). However, the external electronic device 500 may recognize a situation where power is supplied via the first power port 541 before receiving the notification from the electronic device 400 to recognize that the electronic device 400 is connected with the power supply 600.

In operation 830, the external electronic device 500 (e.g., an external electronic processor 510 of FIG. 6) may be converted into a mode of maintaining its power-on state using power supplied from the power supply 600. In operation 835, the external electronic device 500 (e.g., the external electronic processor 510) may attempt to supply power to the electronic device 400 via a second power port 542 of FIG. 6. Power supplied to the electronic device 400 via the second power port 542 may not be supplied to a voltage regulator 420 of FIG. 6 by a voltage difference between the power and power supplied from the power supply 600.

In operation 840, the power supply 600 and the electronic device 400 may be disconnected from each other. In operation 845, if power supplied from the power supply 600 disappears, power input via the second power port 442, which does not enter the voltage regulator 420 by a voltage difference, may be supplied to the voltage regulator 420 to maintain a power-on state of the electronic device 400.

In operation 850, the electronic device 400 (e.g., the processor 410) may transmit notification that it is disconnected from the power supply 600 to the external electronic device 500 via a data communication port 443 of FIG. 6. However, the external electronic device 500 (e.g., the external electronic device processor 510) may recognize a situation where power supplied via the first power port 541 is interrupted before receiving the notification from the electronic device 400 to recognize that the power supply 600 and the electronic device 400 are disconnected from each other.

In operation 855, the external electronic device 500 (e.g., the external electronic device processor 510) may be changed to a state where power is supplied to the electronic device 400 via the first power port 541. In operation 860, the external electronic device 500 may supply power to the electronic device 400 via the first power port 541. In operation 865, the electronic device 400 (e.g., the processor 410) may turn off the first switch 460 to interrupt power supplied from the second power port 442.

Figure 9:
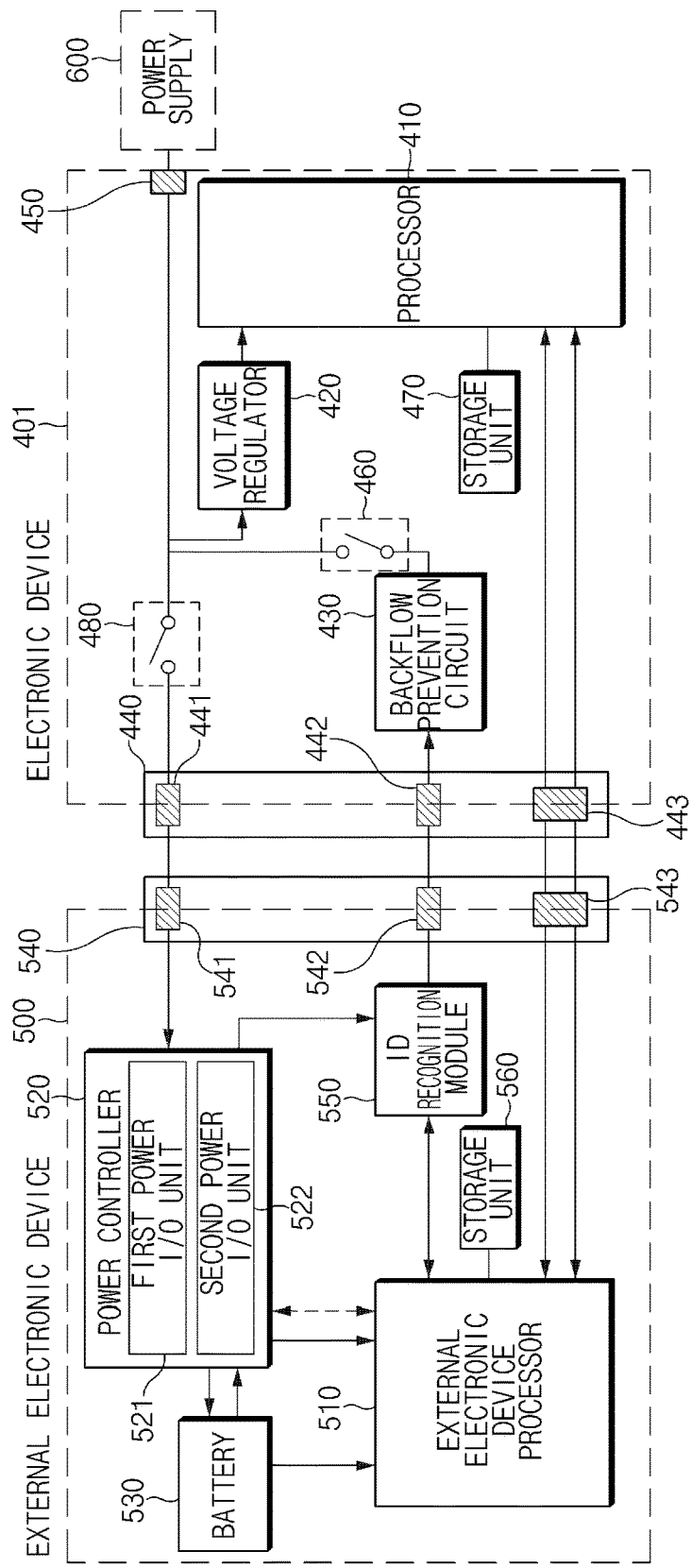
FIG. 9 is a block diagram illustrating an example situation where an electronic device interworks with a mobile terminal and a power supply if the electronic device includes a second switch according to an example embodiment of the present disclosure.

FIG. 9 is a block diagram illustrating an example situation where an electronic device interworks with a mobile terminal and a power supply if the electronic device includes a second switch according to an example embodiment of the present disclosure.

Referring to FIG. 9, an electronic device 401 may include a processor (e.g., including processing circuitry) 410, a voltage regulator 420, a backflow prevention circuit 430, a first connector 440, a second connector 450, a first switch 460, a storage unit 470, and/or a second switch 480.

The electronic device 401 according to an example embodiment of the present disclosure may further include only the second switch 480 and may have a similar configuration to an electronic device 400 of FIG. 6. Thus, hereinafter, a description of a configuration repeated with the electronic device 400 will be omitted.

The second switch 480 may be disposed between a first power port 441 and the second connector 450. If turning on the second switch 480, the electronic device 401 may supply power, input from the power supply 600, to the external electronic device 500. According to an example embodiment, the electronic device 401 (e.g., the processor 410) may control the second switch 480 to be in a closed state in response to connecting the power supply 600 to the electronic device 401. If the power supply 600 is detached from the electronic device 401, the electronic device 401 (e.g., the processor 410) may control the second switch 480 to be in an open state. According to another example embodiment, if the power supply 600 is attached or detached from the electronic device 401, the second switch 480 may be in a closed or open state automatically without intervention of the processor 410 or by another component of the electronic device 401.

If the power supply device 600 is detached form the electronic device 401, as described above, power supply via a second power port 442 may be started. At this time, the second switch 480 may be in an open state. If recognizing detachment of the power supply 600, the processor 410 may provide detachment information to the external electronic device 500 and may close the second switch 480. If power supply is started via the first power port 441 from the external electronic device 500, the processor 410 may open the first switch 460 to limit power supply via the second power port 442. In an example embodiment, the electronic device 401 may finally receive power from the external electronic device 500 via the first power port 441.

Further, power supplied from the external electronic device 500 may be supplied to the electronic device 401.

If turning off the second switch 480, the electronic device 401 may prevent power supplied from the second power port 442 from being transmitted to the first power port 441.

Figure 10:
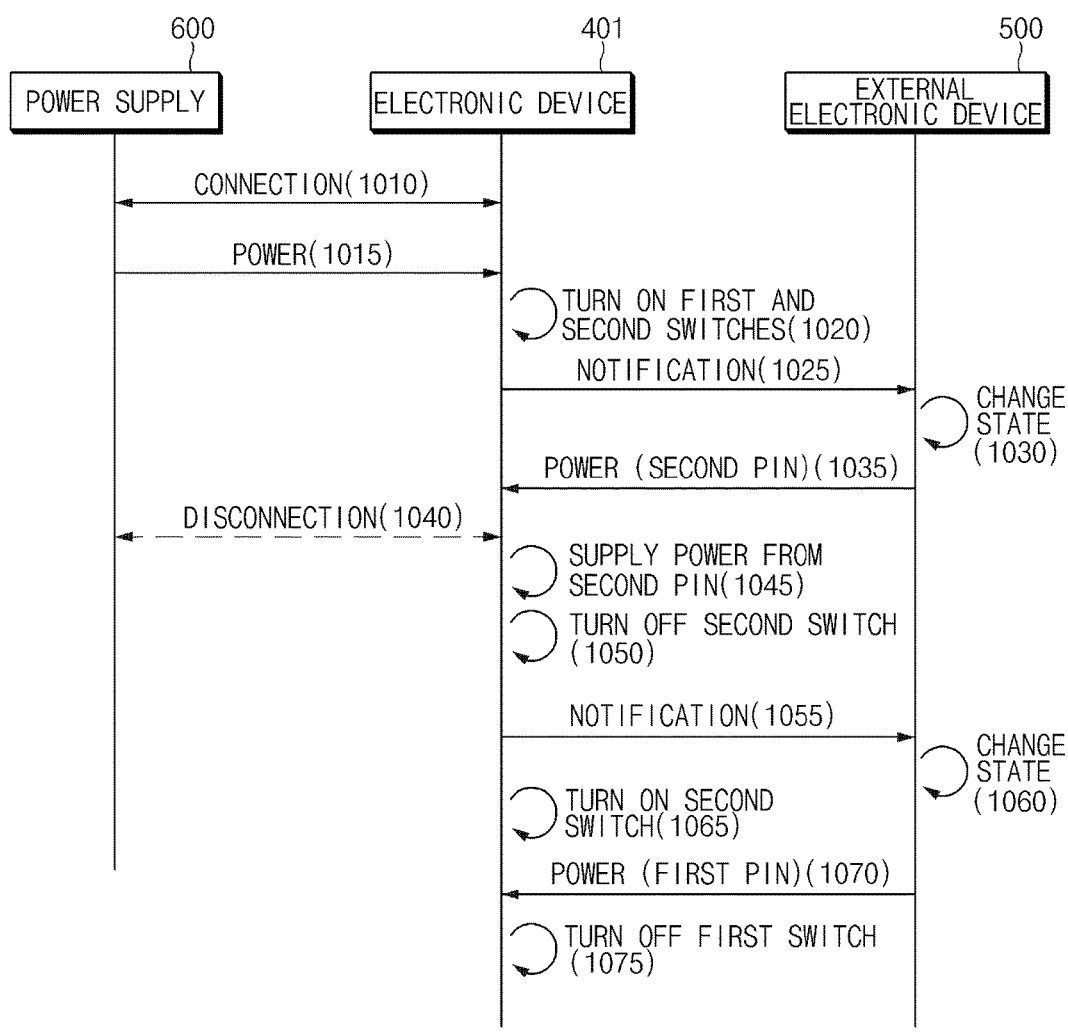
FIG. 10 is a signal sequence diagram illustrating an example operation where an electronic device interworks with a mobile terminal and a power supply if the electronic device includes a second switch according to an example embodiment of the present disclosure.

FIG. 10 is a signal sequence diagram illustrating an example operation where an electronic device interworks with a mobile terminal and a power supply if the electronic device includes a second switch according to an example embodiment of the present disclosure.

Referring to FIG. 10, in operation 1010, an electronic device 401 and a power supply 600 are electrically connected with each other. In operation 1015, the power supply 600 may supply power to the electronic device 401. The electronic device 401 may maintain its power-on state using the power supplied from the power supply 600.

In operation 1020, the electronic device 401 may turn on a first switch 460 and a second switch 480 of FIG. 9 to connect at least part of a power line coupled to the power supply 600 to a first power port 441 of FIG. 9. In various embodiments, if the first switch 460 and the second switch 480 are in an ON state already, operation 1020 may be omitted.

In operation 1025, the electronic device 401 may send notification that it is connected with the power supply 600 to an external electronic device 500. The electronic device 401 and the external electronic device 500 may communicate the notification using a port of a connector (e.g., data communication ports 443 and 543 of FIG. 9). However, the external electronic device 500 may recognize a situation where power is supplied via the first power port 541 before receiving the notification from the electronic device 401 to recognize that the power supply 600 and the electronic device 400 are connected with each other.

In operation 1030, the external electronic device 500 may be converted into a mode of maintaining its power-on state using power supplied from the power supply 600. In operation 1035, the external electronic device 500 may attempt to supply power to the electronic device 401 via a second power port 542 of FIG. 9. Power supplied to the electronic device 401 via the second power port 542 may fail to be supplied to a voltage regulator 420 of FIG. 9 by a voltage difference between the power and power supplied from the power supply 600.

In operation 1040, the power supply 600 and the electronic device 401 may be disconnected from each other. In operation 1045, if power supplied from the power supply 600 disappears, power input via the second power port 442, which does not enter the voltage regulator 420 by a voltage difference, may be supplied to the voltage regulator 420 to maintain a power-on state of the electronic device 401. In operation 1050, the electronic device 401 may turn off the second switch 480 to prevent power supplied via the second power port 442 from progressing in the direction of the first power port 441.

In operation 1055, the electronic device 401 may transmit notification that it is disconnected from the power supply 600 to the external electronic device 500 via a data communication port 443 of FIG. 9. However, the external electronic device 500 may recognize a situation where power supplied via the first power port 541 is interrupted before receiving the notification from the electronic device 401 to recognize that the power supply 600 and the electronic device 400 are disconnected from each other.

In operation 1060, the external electronic device 500 may be changed to a state where power is supplied to the electronic device 401 via the first power port 541. In operation 1065, the electronic device 401 may turn on the second switch 480 to prepare to receive power via the first power port 441. In operation 1070, the external electronic device 500 may supply power to the electronic device 401 via the first power port 541. In operation 1075, the electronic device 401 may turn off the first switch 460 to interrupt power supplied from the second power port 442.

Figure 11:
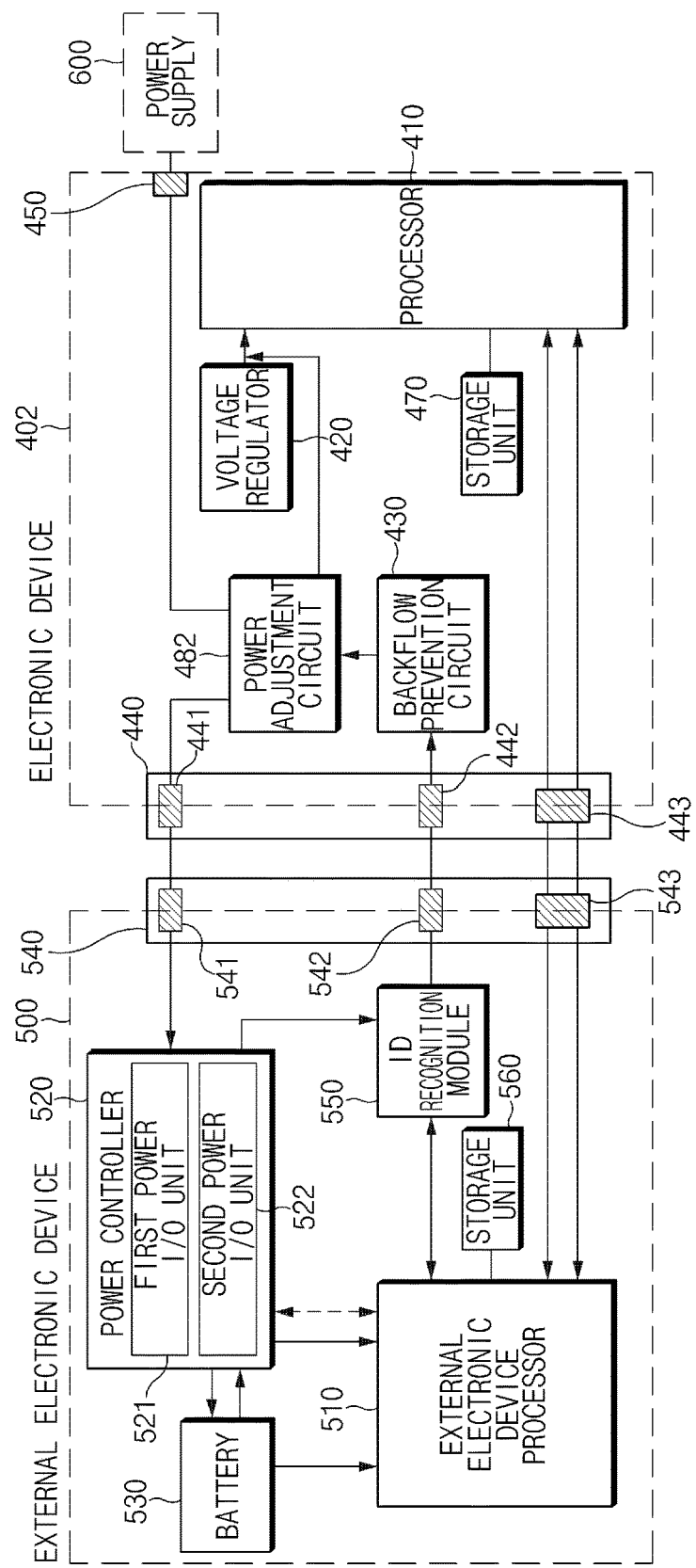
FIG. 11 is a block diagram illustrating an example situation where an electronic device interworks with a mobile terminal and a power supply if the electronic device includes a power adjustment circuit according to an example embodiment of the present disclosure.

FIG. 11 is a block diagram illustrating an example situation where an electronic device interworks with a mobile terminal and a power supply if the electronic device includes a power adjustment circuit according to an example embodiment of the present disclosure.

Referring to FIG. 11, an electronic device 402 may include a processor (e.g., including processing circuitry) 410, a voltage regulator 420, a backflow prevention circuit 430, a first connector 440, a second connector 450, a storage unit 470, and/or a power adjustment circuit 482.

The electronic device 402 according to an example embodiment of the present disclosure may further include only the power adjustment circuit 482 and may have a similar configuration to an electronic device 400 of FIG. 6. Thus, hereinafter, a description of a configuration repeated with the electronic device 400 will be omitted.

The power adjustment circuit 482 may include, for example, a PMIC. The power adjustment circuit 482 may include a plurality of output ports. The power adjustment circuit 482 may properly divide power supplied from a power supply 600 and may supply the divided powers to the electronic device 402 and an external electronic device 500. Also, the power adjustment circuit 482 may supply power, supplied from the external electronic device 500, to a processor 410 of the electronic device 402.

According to various example embodiments, if power is supplied from the power supply 600 to the electronic device 402, the power adjustment circuit 482 may maintain a power-on state of the electronic device 402 using the power supplied from the power supply device 600. Also, if power is supplied to the external electronic device 500 via a first power port 441, the power adjustment circuit 482 may maintain a power-on state of the electronic device 402 using the power supplied via the first power port 441. According to various example embodiments, if power is supplied from the power supply 600 to the electronic device 402 and if power is supplied to the electronic device 402 via a second power port 442, the power adjustment circuit 482 may maintain the power-on state of the electronic device 402 using the power supplied from the power supply 600. According to various example embodiments, if power supplied from the power supply 600 is interrupted, the power adjustment circuit 482 may maintain the power-on state of the electronic device 402 using the power supplied via the second power port 442.

Further, if power is supplied to the external electronic device 500 via the first power port 441 and if power is supplied to the electronic device 402 via the second power port 442, the power adjustment circuit 482 may maintain the power-on state of the electronic device 402 using the power supplied via the first power port 441.

The various operations of the power adjustment circuit 482 may be controller by the processor 410.

Figure 12:
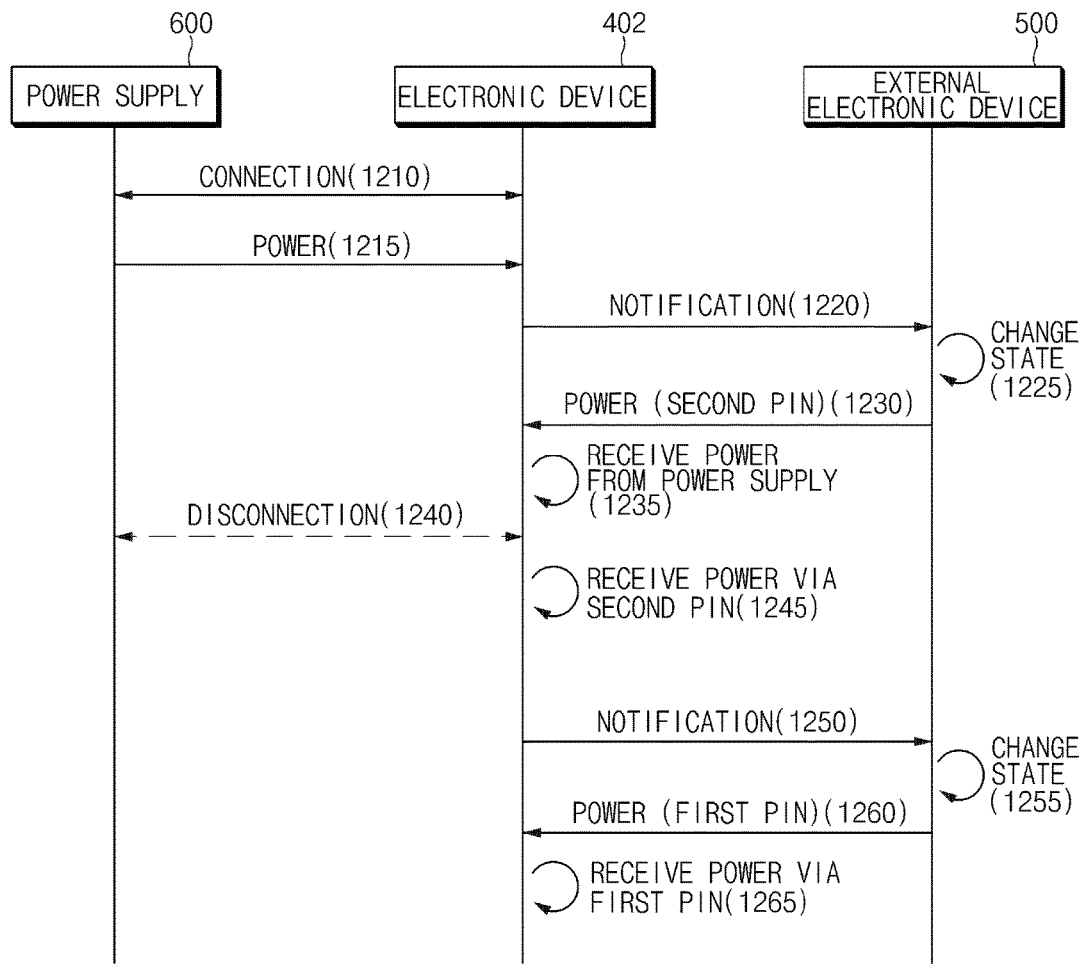
FIG. 12 is a signal sequence diagram illustrating an example operation where an electronic device interworks with a mobile terminal and a power supply if the electronic device includes a power adjustment circuit according to an example embodiment of the present disclosure.

FIG. 12 is a signal sequence diagram illustrating an example operation where an electronic device interworks with a mobile terminal and a power supply if the electronic device includes a power adjustment circuit according to an example embodiment of the present disclosure.

Referring to FIG. 12, in operation 1210, an electronic device 402 and a power supply 600 are electrically connected with each other. In operation 1215, the power supply 600 may supply power to the electronic device 402. The electronic device 402 may maintain its power-on state using the power supplied from the power supply 600.

In operation 1220, the electronic device 402 may send notification that it is connected with the power supply 600 to an external electronic device 500. The electronic device 402 and the external electronic device 500 may communicate the notification using a port of a connector (e.g., data communication ports 443 and 543 of FIG. 11). The electronic device 402 may supply part of power supplied from the power supply 600 to the external electronic device 500.

In operation 1225, the external electronic device 500 may be converted into a mode of maintaining its power-on state using power supplied from the power supply 600. In operation 1230, the external electronic device 500 may attempt to supply power to the electronic device 402 via a second power port 542 of FIG. 11. Since the electronic device 402 is connected with the power supply 600, it may maintain the power-on state using power supplied via the power supply 600 in operation 1235.

In operation 1240, the power supply 600 and the electronic device 400 may be disconnected from each other. In operation 1245, if power supplied from the power supply 600 disappears, a power adjustment circuit 482 of the electronic device 402 may maintain the power-on state of the electronic device 402 using power supplied via a second power port 442 of FIG. 11. In operation 1250, the electronic device 402 may transmit notification that it is disconnected from the power supply 600 to the external electronic device 500 via a port of a connector (e.g., the data communication port 443).

In operation 1255, the external electronic device 500 may be changed to a state where power is supplied to the electronic device 402 via a first power port 541 of FIG. 11. In operation 1260, the external electronic device 500 may supply power to the electronic device 402 via the first power port 541. In operation 1265, the power adjustment circuit 482 of the electronic device 402 may maintain the power-on state of the electronic device 402 using power supplied via the first power port 441.

Figure 13:
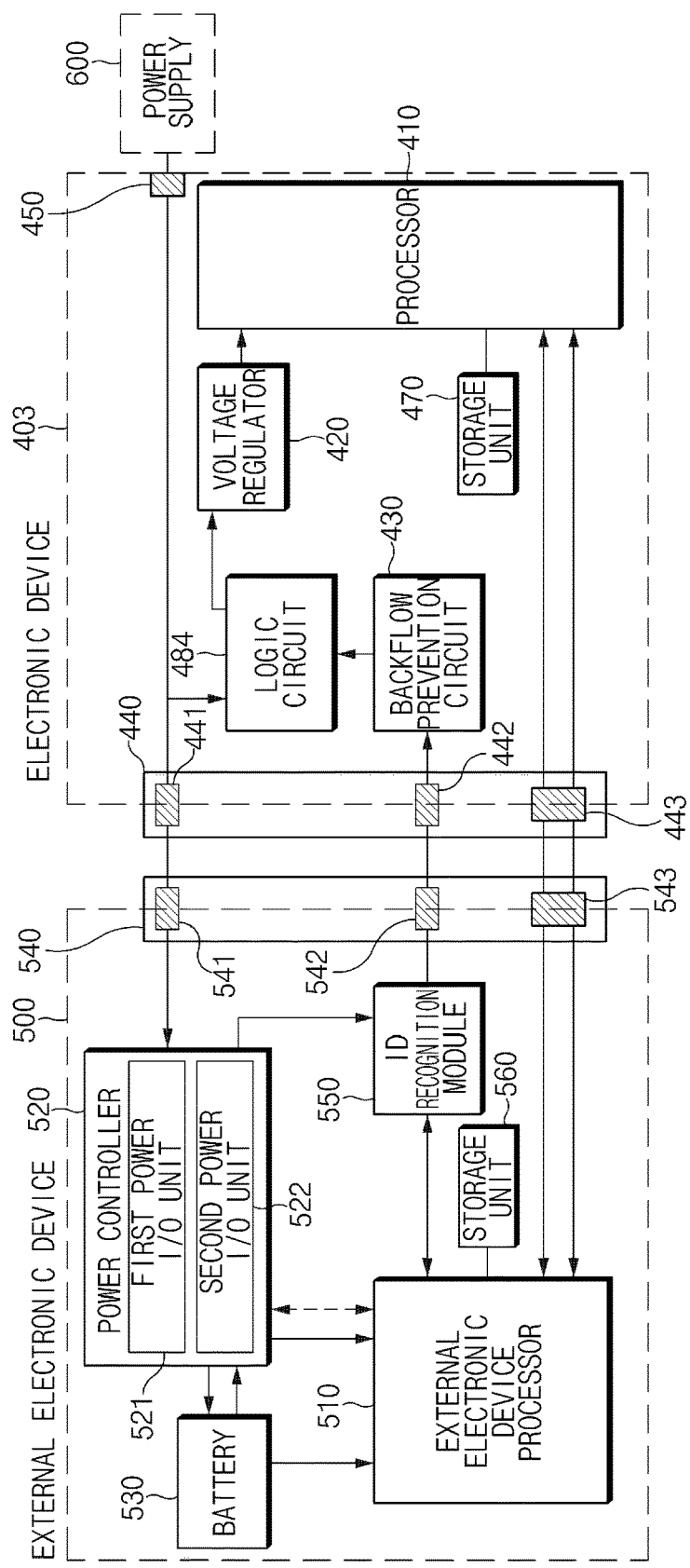
FIG. 13 is a block diagram illustrating an example situation where an electronic device interworks with a mobile terminal and a power supply if the electronic device includes a logic circuit according to an example embodiment of the present disclosure.

FIG. 13 is a block diagram illustrating an example situation where an electronic device interworks with a mobile terminal and a power supply if the electronic device includes a logic circuit according to an example embodiment of the present disclosure.

Referring to FIG. 13, an electronic device 403 may include a processor (e.g., including processing circuitry) 410, a voltage regulator 420, a backflow prevention circuit 430, a first connector 440, a second connector 450, a storage unit 470, and/or a logic circuit 484.

The electronic device 403 according to an example embodiment of the present disclosure may further include only the logic circuit 484 and may have a similar configuration to an electronic device 400 of FIG. 6. Thus, hereinafter, a description of a configuration repeated with the electronic device 400 will be omitted.

The logic circuit 484 may be electrically connected and arranged among the backflow prevention circuit 430, the voltage regulator 420, and a first power port 441. The logic circuit 484 may determine whether to supply power input through any path to the voltage regulator 420 based on the number of paths of power input to the logic circuit 484.

For example, if the paths of the power input to the logic circuit 484 are two paths, the logic circuit 484 may supply one power to the voltage regulator 420. For example, if the paths of the power input to the logic circuit 484 are a path of power supplied from the first power port 441 or the second connector 450 and a path of power supplied from a second power port 442, the logic circuit 484 may supply one power, input from the first power port 442 or the second connector 450, to the voltage regulator 420. Also, if a path of power input to the logic circuit 484 is one path, the logic circuit 484 may supply the corresponding power (e.g., the power supplied from the first power port 441 or the second connector 450 or the power input via the second power port 442) to the voltage regulator 420. If power supply from a power supply 600 is interrupted based on such logic flow, the logic circuit 482 may maintain a power-on state of the electronic device 403.

Figure 14:
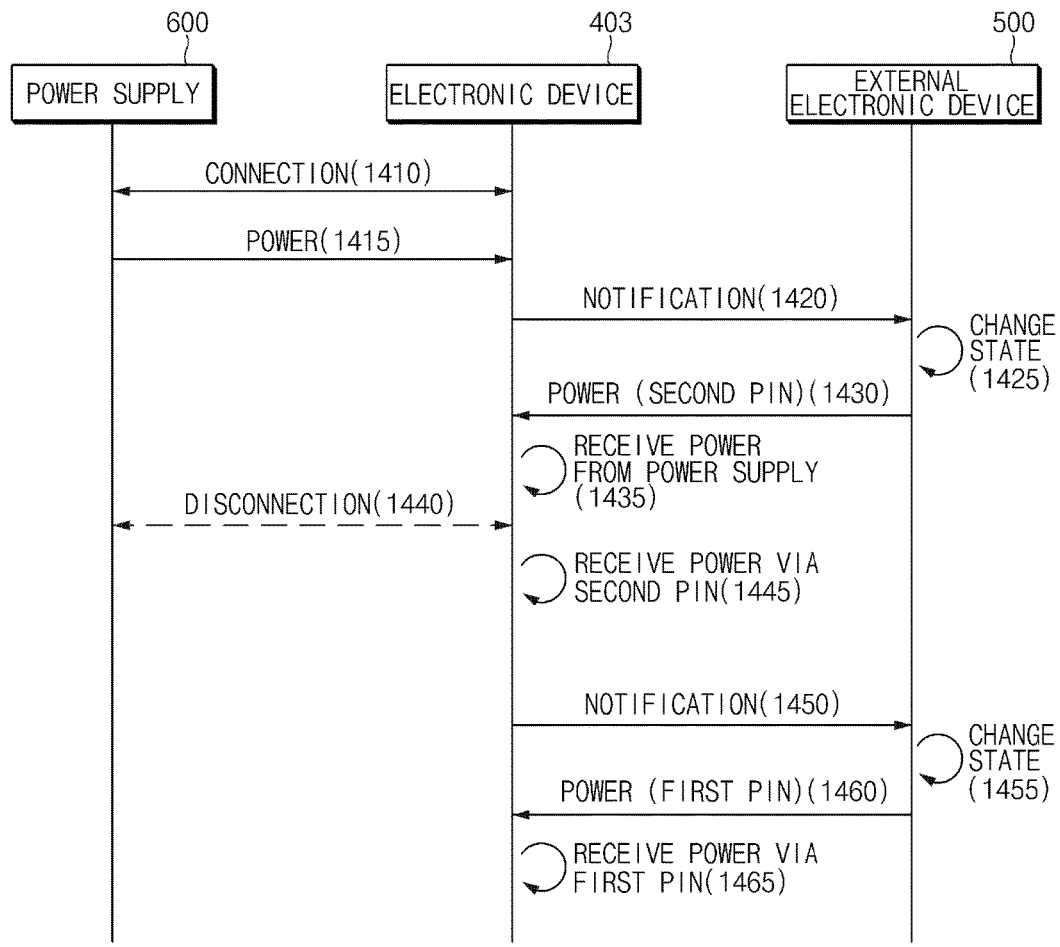
FIG. 14 is a signal sequence diagram illustrating an example operation where an electronic device interworks with a mobile terminal and a power supply if the electronic device includes a logic circuit according to an example embodiment of the present disclosure.

FIG. 14 is a signal sequence diagram illustrating an example operation where an electronic device interworks with a mobile terminal and a power supply if the electronic device includes a logic circuit according to an example embodiment of the present disclosure.

Referring to FIG. 14, in operation 1410, an electronic device 403 and a power supply 600 are electrically connected with each other. In an example embodiment, before the electronic device 403 and the power supply 600 are connected to each other, an external electronic device 500 may supply power to the electronic device 403 via a first power port 441 of FIG. 13. Since power currently input to a logic circuit 482 of FIG. 13 is one power supplied via the first power port 441, the logic circuit 482 may maintain a power-on state of the electronic device 403 using the corresponding power.

In operation 1415, the power supply 600 may supply power to the electronic device 403. In operation 1420, the electronic device 403 may send notification that it is connected with the power supply 600 to the external electronic device 500. The electronic device 403 and the external electronic device 500 may communicate the notification using a port of a connector (e.g., data communication ports 443 and 543 of FIG. 13). The electronic device 403 may supply part of power supplied from the power supply 600 to the external electronic device 500.

In operation 1425, the external electronic device 500 may be converted into a mode of maintaining its power-on state using power supplied from the power supply 600. In operation 1430, the external electronic device 500 may attempt to supply power to the electronic device 403 via a second power port 542 of FIG. 13. If paths of power currently input to the logic circuit 482 is two paths, the logic circuit 482 maintain the power-on state of the electronic device 403 using power input via a second connector 450 of FIG. 13 in operation 1435.

In operation 1440, the power supply 600 and the electronic device 403 may be disconnected from each other. In operation 1445, if power supplied from the power supply 600 disappears, since paths of power supplied to the logic circuit 484 is two paths, the logic circuit 484 of the electronic device 403 may maintain the power-on state of the electronic device 403 using power supplied via the second power port 442. In operation 1450, the electronic device 403 may transmit notification that it is disconnected from the power supply 600 to the external electronic device 500 via the data communication port 443.

In operation 1455, the external electronic device 500 may be changed to a state where power is supplied to the electronic device 403 via the first power port 541. In operation 1460, the external electronic device 500 may supply power to the electronic device 403 via the first power port 541. In operation 1465, since paths of power currently supplied to the logic circuit 484 is two paths, the logic circuit 484 may maintain the power-on state of the electronic device 403 using power supplied via the first power port 441.

As such, although the electronic device 403 is disconnected from the power supply 600 using the logic circuit 484, it may maintain the power-on state.

Figure 15:
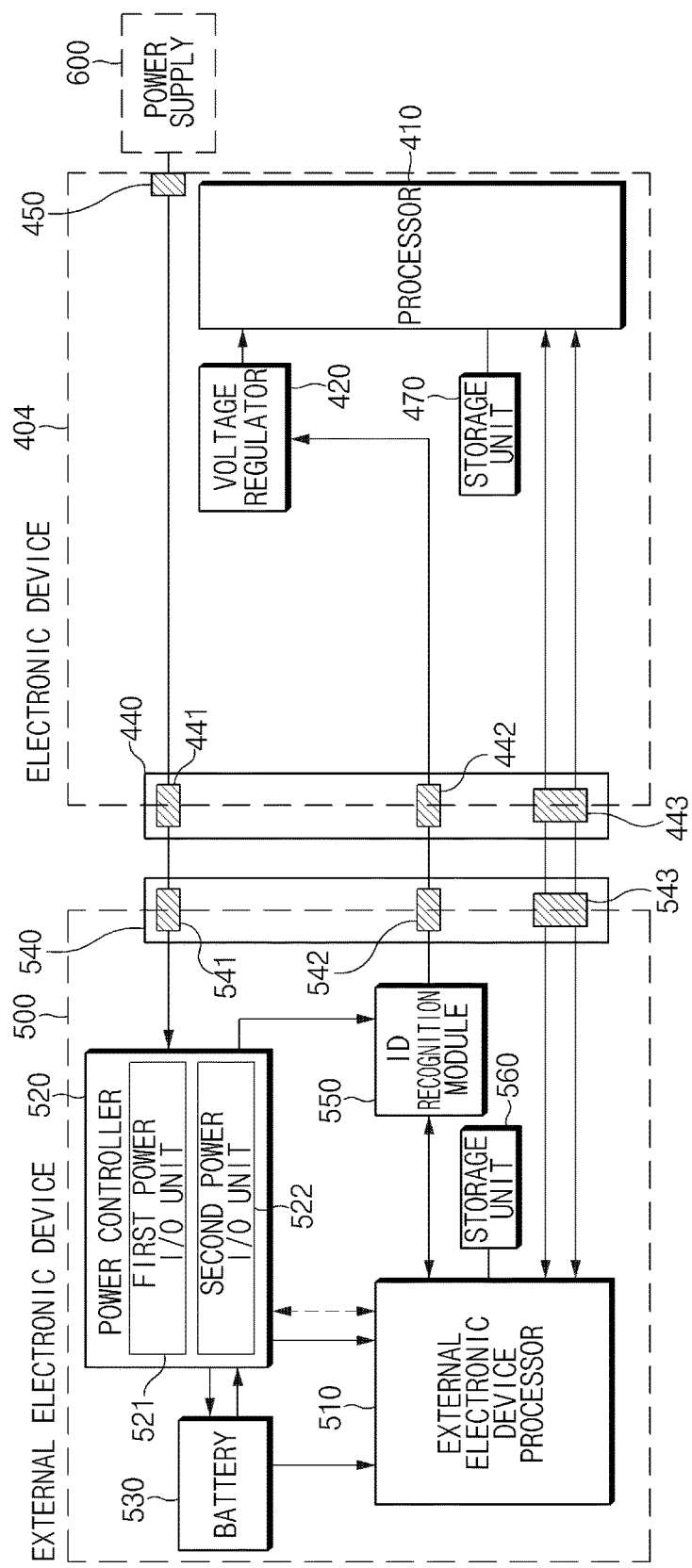
FIG. 15 is a block diagram illustrating an example situation where an electronic device interworks with a mobile terminal and a power supply if there is no a backflow prevention circuit in the electronic device according to an example embodiment of the present disclosure.

FIG. 15 is a block diagram illustrating an example situation where an electronic device interworks with a mobile terminal and a power supply if there is no a backflow prevention circuit in the electronic device according to an example embodiment of the present disclosure.

Referring to FIG. 15, an electronic device 404 may include a processor (e.g., including processing circuitry) 410, a voltage regulator 420, a first connector 440, a second connector 450, and/or a storage unit 470.

Only a backflow prevention circuit 430 (and associated circuitry, e.g., switch) of FIG. 6 is omitted from the electronic device 404 according to an example embodiment of the present disclosure. The electronic device 404 may have a similar configuration to an electronic device 400 of FIG. 6. Thus, hereinafter, a description of a configuration repeated with the electronic device 400 will be omitted.

If there is no the backflow prevention circuit 430 in the electronic device 404, the electronic device 404 may supply power supplied from the power supply 600 to an external electronic device 500 via a first power port 441. The external electronic device 500 may be driven using power supplied via the first power port 541 or may charge a battery 530 using the power supplied via the first power port 541.

In an example embodiment, the external electronic device 500 may supply power to an ID recognition module 550 via a second power I/O unit 522 of a power controller 520. The power may be supplied to the electronic device 404 via a second power port 542. The electronic device 404 may be driven using power supplied via the second power port 442.

In FIG. 15, an embodiment is exemplified as an ID port and a second power port are implemented as the same port 542. Embodiments are not limited thereto. For example, the ID port and the second power port may be implemented as ports of independent of each other. In this case, a power line connected to the second power I/O unit 522 may be connected to the second power port in the form of not passing the ID recognition module 550.

In other words, according to an example embodiment, the external electronic device 500 may supply power to the second power port 542 via the second power I/O unit 522 of the power controller 520. The power may be supplied to the electronic device 404. The electronic device 404 may be driven using power supplied via the second power port 442. Although the power supply 600 and the electronic device 404 are disconnected from each other, the electronic device 404 may maintain its power-on state using power supplied via the second power port 442.

Figure 16:
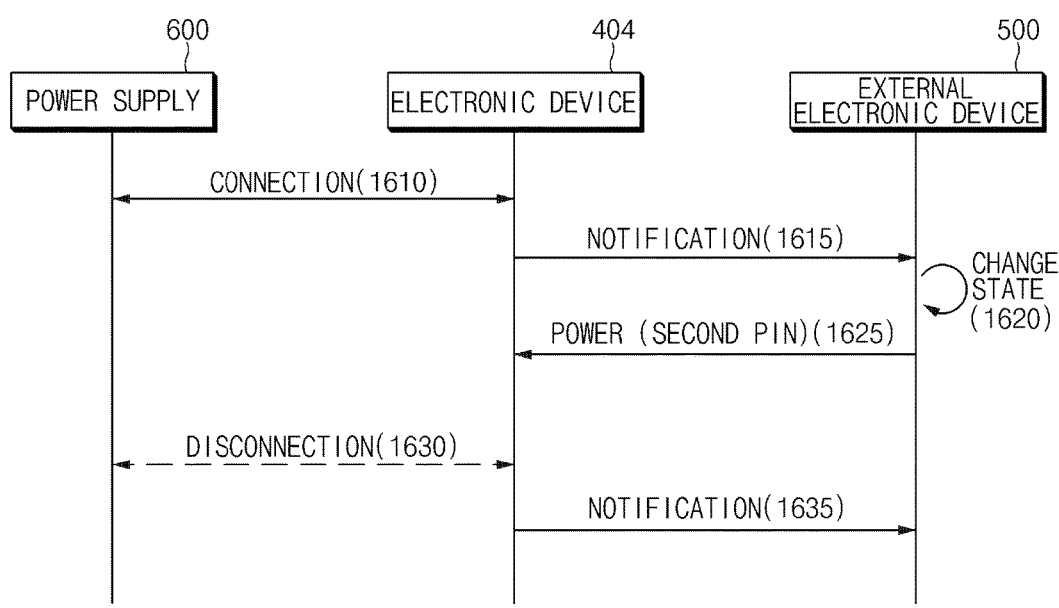
FIG. 16 is a signal sequence diagram illustrating an example operation where an electronic device interworks with a mobile terminal and a power supply if there is no a backflow prevention circuit in the electronic device according to an example embodiment of the present disclosure.

FIG. 16 is a signal sequence diagram illustrating an example operation where an electronic device interworks with a mobile terminal and a power supply if there is no a backflow prevention circuit in the electronic device according to an example embodiment of the present disclosure.

Referring to FIG. 16, in operation 1610, an electronic device 404 and a power supply 600 are electrically connected with each other. In operation 1615, the electronic device 404 may send notification that it is connected with the power supply 600 to the external electronic device 500. The electronic device 404 and the external electronic device 500 may communicate the notification using a port of a connector (e.g., data communication ports 443 and 543 of FIG. 15). The electronic device 404 may supply all of power supplied from the power supply 600 to the external electronic device 500.

In operation 1620, the external electronic device 500 may be converted into a mode of maintaining its power-on state using power supplied from the power supply 600. In operation 1625, the external electronic device 500 may supply power to the electronic device 404 via a second power port 542 of FIG. 15. The electronic device 404 may be driven using power supplied via a second power port 442.

In operation 1630, the power supply 600 and the electronic device 404 may be disconnected from each other. Since the electronic device 404 receives power from the external electronic device 500, although it is disconnected from the power supply 600, it may maintain its power-on state. In operation 1635, the electronic device 404 may transmit notification that it is disconnected from the power supply 600 to the external electronic device 500 via the data communication port 443. However, since the external electronic device 500 recognizes that power input via a first power port 541 of FIG. 15 disappears, although there is no the notification, the external electronic device 500 may recognize that the electronic device 404 and the power supply 600 are disconnected from each other. In operation 1640, the external electronic device 500 may be changed to a state where it is driven using power stored in a battery 530 of FIG. 15.

As such, although the electronic device 404 is disconnected from the power supply 600, it may maintain the power-on state.

The operations (e.g., operations 710 to 745, operations 750 to 770, operations 810 to 865, operations 1010 to 1075, operations 1210 to 1265, operations 1410 to 1465, or operations 1610 to 1635) described in the processes or methods shown in FIG. 7A, 7B, 8, 10, 12, 14, or 16 may be executed by a successive method, a parallel method, a repeated method, or a heuristic method. For example, the operations may be executed in a different order. Some operations may be omitted from the operations, or another operation may be added to the operations.

A method of controlling an electronic device according to an example embodiment of the present disclosure may include notifying a mobile terminal that the electronic device is connected with a power supply if the electronic device is attached to the power supply, supplying power to the mobile terminal via a first electronic path, receiving power from the mobile terminal via a second electronic path in response to detachment of the power supply from the electronic device, notifying the mobile terminal that the electronic device is disconnected from the power supply, and receiving power from the mobile terminal via the first electronic path.

In the method of controlling the electronic device according to various example embodiments of the present disclosure, the electronic device may include a first switch. The method may further include closing the first switch if the electronic device is attached to the power supply and opening the first switch if the electronic device is detached from the power supply.

In the method of controlling the electronic device according to various example embodiments of the present disclosure, the electronic device may include a second switch disposed on the first electronic path. The method may further include closing the second switch if the electronic device is attached to the power supply and opening the second switch if the electronic device is detached from the power supply.

In the method of controlling the electronic device according to various example embodiments of the present disclosure, the electronic device may include a power adjustment circuit. The method may further include supplying, by the power adjustment circuit, power to the mobile terminal via the first electronic path if the electronic device is attached to the power supply and receiving, by the power adjustment circuit, power from the mobile terminal via the second electronic path if the electronic device is detached from the power supply.

In the method of controlling the electronic device according to various example embodiments of the present disclosure, the electronic device may include a logic circuit. The method may further include supplying, by the logic circuit, power supplied via the first electronic path to the electronic device if paths of power supplied to the logic circuit are two paths and receiving, by the logic circuit, power from the mobile terminal via the second electronic path if the paths of the power supplied to the logic circuit are not two paths.

Figure 17:
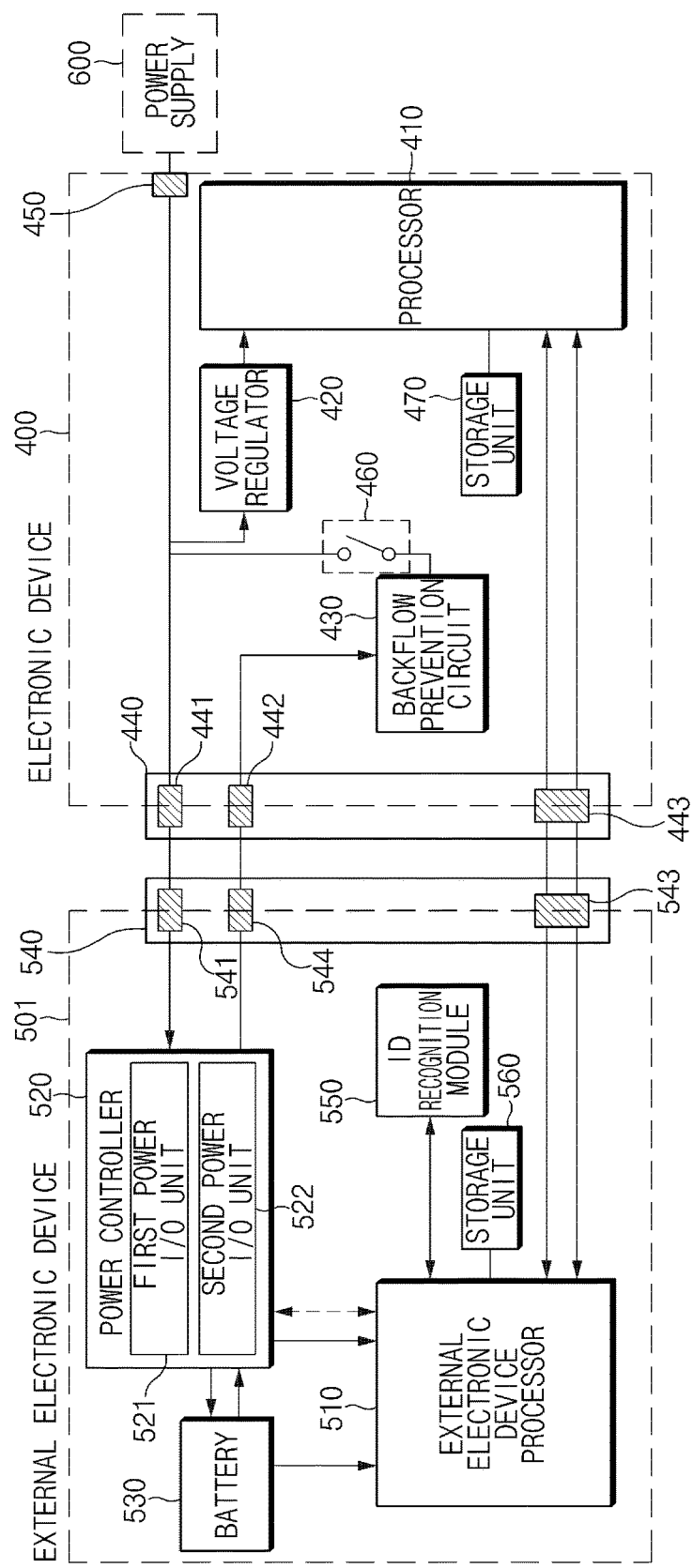
FIG. 17 is a block diagram illustrating an example situation where a mobile terminal interworks with a mobile terminal and a power supply using a plurality of VBUS pins according to an example embodiment of the present disclosure.

FIG. 17 is a block diagram illustrating an example situation where a mobile terminal interworks with a mobile terminal and a power supply using a plurality of VBUS pins according to an example embodiment of the present disclosure.

Referring to FIG. 17, an external electronic device 501 may include an external electronic device processor (e.g., including processing circuitry) 510, a power controller 520, first and second power I/O units 521 and 522, a battery 530, a connector 540, an ID recognition module 550, and/or a storage unit 560.

Only a third power port 544 is coupled to the second power I/O unit 522 in the external electronic device 501 according to an example embodiment of the present disclosure. The external electronic device 501 may have a similar configuration to an external electronic device 500 of FIG. 6. Thus, hereinafter, a description of a configuration repeated with the external electronic device 500 will be omitted.

A first power port 541 coupled to the power controller 520 may be configured with a plurality of power ports. For example, the first power port 541 may be configured with the plurality of power ports in a form which is symmetrical about upper and lower both sides for compatibility between upper directionality and lower directionality. For example, at least part of the plurality of power ports included in the first power port 541 may be represented as the third power port 544.

The external electronic device 501 may receive power supplied from a power supply 600 via the first power port 541. The first power I/O unit 521 of the power controller 520 may transmit the supplied power to a battery 530 and may be used to drive the external electronic device 501. In this case, the second power I/O controller 522 may supply power to the electronic device 400 via the third power port 544. The power supplied to the electronic device 400 via the third power port 544 may be lower in potential than the power supplied via the first power port 541.

If the electronic device 400 and the power supply 600 are disconnected from each other, the electronic device 400 may maintain its power-on state using power supplied via the third power port 544. A method for maintaining the power-on state by the electronic device 400 is the same as contents described with reference to FIGS. 7A and 7B.

An electronic device according to an example embodiment of the present disclosure may include a first connector including a first pin and a second pin configured to connect with a first external electronic device, a second connector configured to connect with the second external electronic device, and a switch configured to supply power received from the first external electronic device via the second pin to the first pin if the second external electronic device connected with the electronic device via the second connector is disconnected from the electronic device.

In the electronic device according to various example embodiments of the present disclosure, the switch may be configured to not supply the power received from the first external electronic device via the second pin to the first pin if the connection with the first external electronic device is detected.

In the electronic device according to various example embodiments of the present disclosure, the electronic device may further include a connection sensing circuit configured to sense a connection or disconnection of the second external electronic device coupled to the first pin via the second connector and a processor. The processor may be configured to receive a signal associated with the connection via the connection sensing circuit and control a connection of the switch based on the signal.

In the electronic device according to various example embodiments of the present disclosure, the electronic device may further include a connection sensing circuit configured to sense a connection or disconnection of the second external electronic device coupled to the first pin via the second connector and a processor. The processor may be configured to sense another power received from the first external electronic device via the first pin using the connection sensing circuit or another connection sensing circuit and control separation between a path of the power and a path of another power using the switch in response to receiving the other power.

In the electronic device according to various example embodiments of the present disclosure, the second external electronic device may include a power adaptor configured to supply power to the electronic device or the first external electronic device.

An electronic device according to an example embodiment of the present disclosure may include a connector configured to include a first pin and a second pin for connecting with an external electronic device and a processor. The processor may be configured to verify reception of first power via the first pin from the external electronic device and supply second power to the external electronic device via the second pin based on the at least reception of the first power.

In the electronic device according to various example embodiments of the present disclosure, the processor may be configured to verify supply of the first power via the first pin from the external electronic device and prevent second power from being supplied to the external electronic device via the second pin based on the at least supply of the first power.

In the electronic device according to various example embodiments of the present disclosure, the electronic device may further include a battery. The processor may be configured to supply the second power using power of the battery.

An electronic device according to an example embodiment of the present disclosure may include a first connector including a first pin and a second pin configured to be attachable to a mobile terminal, a second connector configured to be attachable to a power supply, and a backflow prevention circuit configured to be electrically connected with the second pin and be disposed to not supply current from the electronic device to the mobile terminal via the second pin. The first pin and the second connector may establish a first electronic path. One point on the first electronic path, the second pin, and the backflow prevention circuit may establish a second electronic path. The backflow prevention circuit may be configured to supply power to the mobile terminal via the first electronic path if the power supply is attached to the second connector and to receive power from the mobile terminal via the second electronic path in response to detachment of the power supply from the second connector.

The electronic device according to various example embodiments of the present disclosure may further include a processor configured to be electrically connected with the first electronic path or the second electronic path.

In the electronic device according to various example embodiments of the present disclosure, the electronic device may further include a first switch configured to be disposed between one point on the first electronic path and the backflow prevention circuit. The processor may be configured to short-circuit the first switch if the power supply is attached to the second connector, transmit a signal for detachment of the power supply to the mobile terminal if the power supply is detached from the second connector, and open the first switch if power is supplied via the first pin from the mobile terminal in response to transmitting the signal.

In the electronic device according to various example embodiments of the present disclosure, the electronic device may further include a second switch configured to be disposed between the first pin and one point on the first electronic path. The processor may be configured to open the second switch if power is supplied to the electronic device via the second electronic path.

In the electronic device according to various example embodiments of the present disclosure, the electronic device may further include a power adjustment circuit configured to be disposed between one point on the first electronic path and the backflow prevention circuit. The power adjustment circuit may be configured to supply power to the mobile terminal via the first electronic path if the power supply is attached to the second connector and receive power from the mobile terminal via the second electronic path if the power supply is detached from the second connector.

In the electronic device according to various example embodiments of the present disclosure, the electronic device may further include a logic circuit configured to be disposed between one point on the first electronic path and the backflow prevention circuit. The logic circuit may be configured to supply power, supplied via the first electronic path, to the processor if paths of power supplied to the logic circuit are two paths and receive power from the mobile terminal via the second electronic path if the paths of the power supplied to the logic circuit are not two paths.

The method for maintaining the power-on state of the above-mentioned electronic device may be performed in various electronic devices. However, embodiments are not limited thereto.

Figure 18:
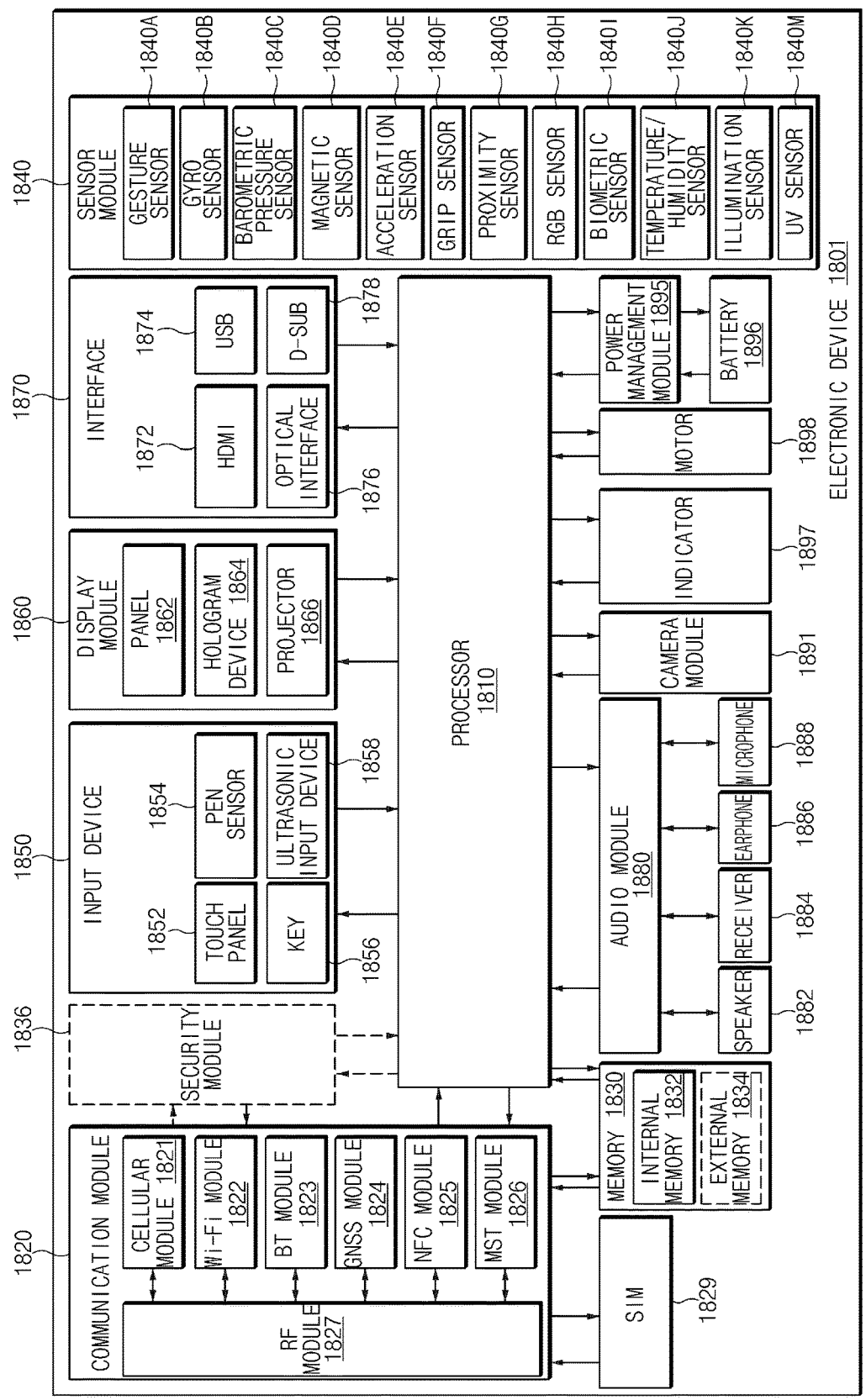
FIG. 18 is a block diagram illustrating an example configuration of an electronic device according to various example embodiments of the present disclosure.

Referring to FIG. 18, the electronic device 1801 may include, for example, a part or the entirety of the electronic device 100 illustrated in FIG. 1. The electronic device 1801 may include at least one processor (e.g., an AP) (e.g., including processing circuitry) 1810, a communication module (e.g., including communication circuitry) 1820, a subscriber identification module (SIM) 1829, a memory 1830, a security module (e.g., including security circuitry) 1836, a sensor module 1840, an input device (e.g., including input circuitry) 1850, a display module 1860, an interface (e.g., including interface circuitry) 1870, an audio module 1880, a camera module 1891, a power management module 1895, a battery 1896, an indicator 1897, and a motor 1898.

The processor 1810 may include various processing circuitry configured to execute, or run, an operating system (OS) or an application program so as to control a plurality of hardware or software elements connected to the processor 1810, process various data, and perform operations. The processor 1810 may include various processing circuitry that may be implemented, for example, in an SoC. According to an example embodiment of the present disclosure, the processor 1810 may further include a graphics processing unit (GPU) and/or an image signal processor. The processor 1810 may include at least a portion (e.g., a cellular module 1821) of the elements illustrated in FIG. 18. The processor 1810 may load, on a volatile memory, an instruction or data received from at least one of the other elements (e.g., a nonvolatile memory) to process the instruction or data, and may store various data in a nonvolatile memory.

The communication module 1820 may be configured the same as or similar to that of the communication circuit 120 of FIG. 1. The communication module 1820 may include various communication circuitry, such as, for example, and without limitation, a cellular module 1821 (e.g., a modem), a WiFi module 1822, a Bluetooth module 1823, a global navigation satellite system (GNSS) module 1824 (e.g., a global positioning system (GPS) module, a global navigation satellite system (GLONASS) module, a BeiDou navigation satellite system module, or a Galileo global navigation satellite system module), a near field communication (NFC) module 1825, a magnetic secure transmission (MST) module 1826, and a radio frequency (RF) module 1827.

The cellular module 1821 may provide, for example, a voice call service, a video call service, a text message service, or an Internet service through a communication network. The cellular module 1821 may identify and authenticate the electronic device 1801 in the communication network using the SIM 1829 (e.g., a SIM card). The cellular module 1821 may perform at least a part of the functions that may be provided by the processor 1810. The cellular module 1821 may include a CP.

Each of the WiFi module 1822, the Bluetooth module 1823, the GNSS module 1824, the NFC module 1825, and the MST module 1826 may include, for example, a processor for processing data transmitted/received through the modules. According to an embodiment of the present disclosure, at least a part (e.g., two or more) of the cellular module 1821, the WiFi module 1822, the Bluetooth module 1823, the GNSS module 1824, the NFC module 1825, and the MST module 1826 may be included in a single integrated circuit (IC) or IC package.

The RF module 1827 may transmit/receive, for example, communication signals (e.g., RF signals). The RF module 1827 may include, for example, a transceiver, a power amplifier module (PAM), a frequency filter, a low noise amplifier (LNA), an antenna, or the like. According to an embodiment of the present disclosure, at least one of the cellular module 1821, the WiFi module 1822, the Bluetooth module 1823, the GNSS module 1824, the NFC module 1825, or the MST module 1826 may transmit/receive RF signals through a separate RF module.

The SIM 1829 may include, for example, an embedded SIM and/or a card containing the SIM, and may include unique identification information (e.g., an integrated circuit card identifier (ICCID)) or subscriber information (e.g., an international mobile subscriber identity (IMSI)).

The memory 1830 (e.g., the memory 160 of FIG. 1) may include, for example, an internal memory 1832 and/or an external memory 1834. The internal memory 1832 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 1834 may include a flash drive such as a compact flash (CF) drive, a secure digital (SD) drive, a micro-SD drive, a mini-SD drive, an extreme digital (xD) drive, a multi media card (MMC), a memory stick, or the like. The external memory 1834 may be operatively and/or physically connected to the electronic device 1801 through various interfaces.

A security module 1836, may include various circuitry, including a module including a storage space that is more secure (e.g. has a higher security level) than the memory 1830, and may be a circuit for providing secure data storage and protected execution circumstances. The security module 1836 may be implemented with an additional circuit and may include an additional processor. The security module 1836 may be present in an attachable smart chip or SD card, or may include an embedded secure element (eSE), which is installed in a fixed chip. Additionally, the security module 1836 may be driven in another OS which is different from the OS of the electronic device 1801. For example, the security module 1836 may operate based on a java card open platform (JCOP) OS.

The sensor module 1840 may, for example, measure a physical quantity or detect an operation state of the electronic device 1801 so as to convert measured or detected information into an electrical signal. The sensor module 1840 may include, for example, at least one of a gesture sensor 1840A, a gyro sensor 1840B, a barometric pressure sensor 1840C, a magnetic sensor 1840D, an acceleration sensor 1840E, a grip sensor 1840F, a proximity sensor 1840G, a color sensor 1840H (e.g., a red/green/blue (RGB) sensor), a biometric sensor 1840I, a temperature/humidity sensor 1840J, an illumination sensor 1840K, or an ultraviolet (UV) light sensor 1840M. Additionally, or alternatively, the sensor module 1840 may include, for example, an olfactory sensor (e.g., an electronic nose (E-nose) sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1840 may further include a control circuit for controlling at least one sensor included therein. In an embodiment of the present disclosure, the electronic device 1801 may further include a processor configured to control the sensor module 1840 as a part of the processor 1810 or separately, so that the sensor module 1840 is controlled while the processor 1810 is in a reduced power, or sleep, state.

The input device 1850 may include various input circuitry, such as, for example, and without limitation, a touch panel 1852, a (digital) pen sensor 1854, a key 1856, or an ultrasonic input device 1858. The touch panel 1852 may employ at least one of a capacitive method, a resistive method, an infrared method, and an ultraviolet light sensing method. The touch panel 1852 may further include a control circuit. The touch panel 1852 may further include a tactile layer so as to provide a haptic feedback to a user.

The (digital) pen sensor 1854 may include, for example, a sheet for recognition which is a part of a touch panel or is separate. The key 1856 may include, for example, a physical button, an optical button, or a keypad. The ultrasonic input device 1858 may sense ultrasonic waves generated by an input tool through a microphone 1888 so as to identify data corresponding to the ultrasonic waves sensed.

The display module 1860 (e.g., the display 170 of FIG. 1) may include a panel 1862, a hologram device 1864, or a projector 1866. The panel 1862 may be configured the same as or similar to that of the display 170 of FIG. 1. The panel 1862 may be, for example, flexible, transparent, or wearable. The panel 1862 and the touch panel 1852 may be integrated into a single module. The hologram device 1864 may display a stereoscopic image in a space using a light interference phenomenon. The projector 1866 may project light onto a screen so as to display an image. The screen may be disposed internally or externally to the electronic device 1801. According to an embodiment of the present disclosure, the display module 1860 may further include a control circuit for controlling the panel 1862, the hologram device 1864, or the projector 1866.

The interface 1870 may include various interface circuitry, such as, for example, and without limitation, a high definition multimedia interface (HDMI) 1872, a universal serial bus (USB) 1874, an optical interface 1876, or a D-subminiature (D-sub) connector 1878. The interface 1870, for example, may be included in the communication circuit 120 of FIG. 1. Additionally, or alternatively, the interface 1870 may include, for example, a mobile high-definition link (MHL) interface, an SD/MMC interface, or an Infrared Data Association (IrDA) interface.

The audio module 1880 may convert, for example, a sound into an electrical signal or vice versa. The audio module 1880 may process sound information input or output through a speaker 1882, a receiver 1884, an earphone 1886, or the microphone 1888.

The camera module 1891 is, for example, a device for taking a still image or a video. According to an embodiment of the present disclosure, the camera module 1891 may include at least one image sensor (e.g., a front sensor or a rear sensor), a lens, an image signal processor (ISP), or a flash (e.g., a light emitting diode (LED) or a xenon lamp).

The power management module 1895 may manage power of the electronic device 1801. According to an embodiment of the present disclosure, the power management module 1895 may include a power management integrated circuit (PMIC), a charger IC, a battery, or a battery gauge. The PMIC may employ a wired and/or a wireless charging method. A wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 1896 and a voltage, current, or temperature thereof while the battery is charged. The battery 1896 may include, for example, a rechargeable battery and/or a solar battery.

The indicator 1897 may display a certain state of the electronic device 1801 or a part thereof (e.g., the processor 1810), such as a booting state, a message state, a charging state, or the like. The motor 1898 may convert an electrical signal into a mechanical vibration, and may generate a vibration or a haptic effect. A processing device (e.g., a GPU) for supporting mobile TV may be included in the electronic device 1801. The processing device for supporting mobile TV may process media data according to the standards of digital multimedia broadcasting (DMB), digital video broadcasting (DVB), MediaFLO™, or the like.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

Figure 19:
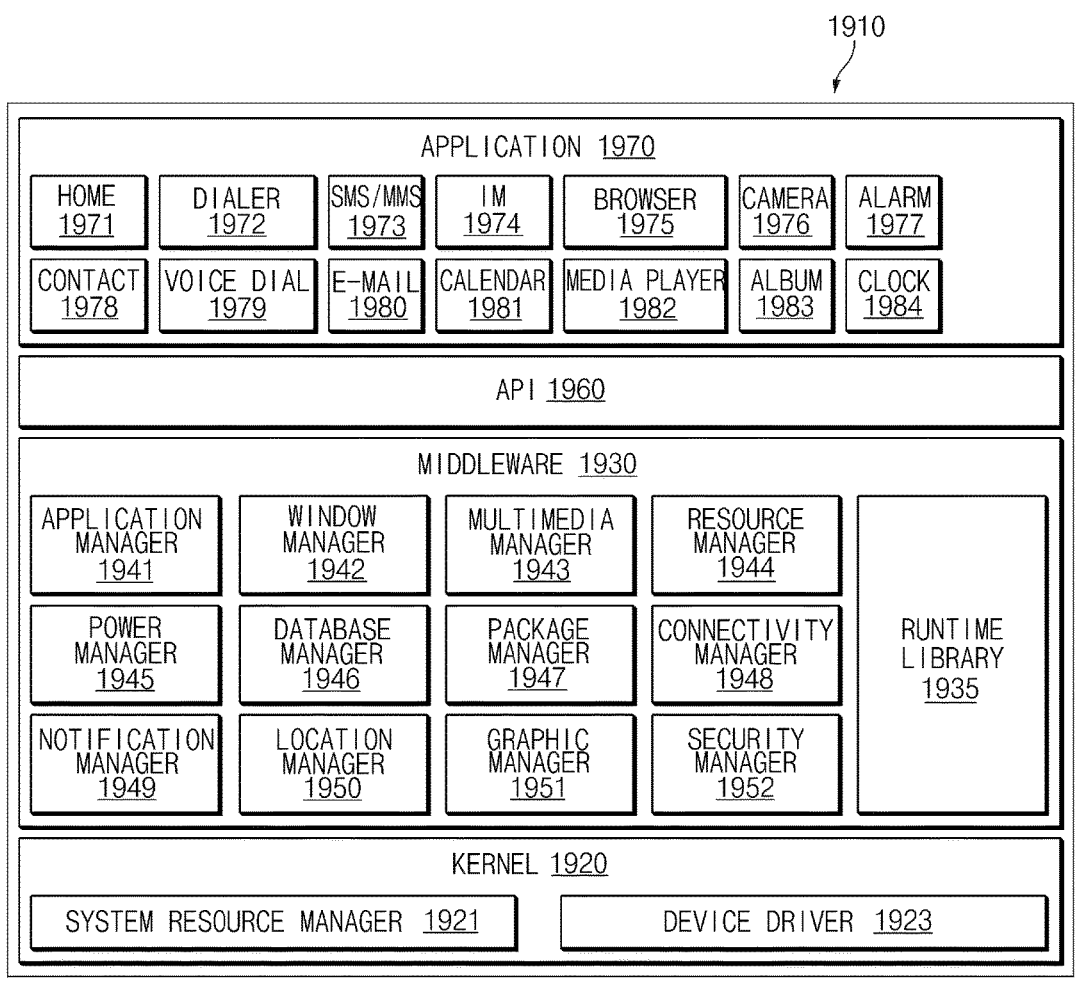
FIG. 19 is a block diagram illustrating an example configuration of a program module according to various example embodiments of the present disclosure.

FIG. 19 is a block diagram illustrating an example configuration of a program module according to various example embodiments of the present disclosure. According to an example embodiment, a program module 1910 (e.g., a program 140 of FIG. 1) may include an operating system (OS) for controlling resources associated with an electronic device (e.g., an electronic device 101 of FIG. 1) and/or various applications (e.g., an application program 147 of FIG. 1) which are executed on the OS. The OS may be, for example, Android, iOS, Windows, Symbian, Tizen, or Bada, and the like.

The program module 1910 may include a kernel 1920, a middleware 1930, an application programming interface (API) 1960, and/or at least one application 1970. At least part of the program module 1910 may be preloaded on the electronic device, or may be downloaded from an external electronic device (e.g., a first external electronic device 102, a second external electronic device 104, or a server 106, and the like of FIG. 1).

The kernel 1920 (e.g., a kernel 141 of FIG. 1) may include, for example, a system resource manager 1921 and/or a device driver 1923. The system resource manager 1921 may control, assign, or collect, and the like system resources. According to an embodiment, the system resource manager 1921 may include a process management unit, a memory management unit, or a file system management unit, and the like. The device driver 1923 may include, for example, a display driver, a camera driver, a Bluetooth (BT) driver, a shared memory driver, a universal serial bus (USB) driver, a keypad driver, a wireless-fidelity (Wi-Fi) driver, an audio driver, or an inter-process communication (IPC) driver.

The middleware 1930 (e.g., a middleware 143 of FIG. 1) may provide, for example, functions the application 1970 needs in common, and may provide various functions to the application 1970 through the API 1960 such that the application 1970 efficiently uses limited system resources in the electronic device. According to an embodiment, the middleware 1930 (e.g., the middleware 143) may include at least one of a runtime library 1935, an application manager 1941, a window manager 1942, a multimedia manager 1943, a resource manager 1944, a power manager 1945, a database manager 1946, a package manager 1947, a connectivity manager 1948, a notification manager 1949, a location manager 1950, a graphic manager 1951, or a security manager 1952.

The runtime library 1935 may include, for example, a library module used by a compiler to add a new function through a programming language while the application 1970 is executed. The runtime library 1935 may perform a function about input and output management, memory management, or an arithmetic function.

The application manager 1941 may manage, for example, a life cycle of at least one of the at least one application 1970. The window manager 1942 may manage graphic user interface (GUI) resources used on a screen of the electronic device. The multimedia manager 1943 may ascertain a format necessary for reproducing various media files and may encode or decode a media file using a codec corresponding to the corresponding format. The resource manager 1944 may manage source codes of at least one of the at least one application 1970, and may manage resources of a memory or a storage space, and the like.

The power manager 1945 may act together with, for example, a basic input/output system (BIOS) and the like, may manage a battery or a power source, and may provide power information necessary for an operation of the electronic device. The database manager 1946 may generate, search, or change a database to be used in at least one of the at least one application 1970. The package manager 1947 may manage installation or update of an application distributed by a type of a package file.

The connectivity manager 1948 may manage, for example, wireless connection such as Wi-Fi connection or BT connection, and the like. The notification manager 1949 may display or notify events, such as an arrival message, an appointment, and proximity notification, by a method which is not disturbed to the user. The location manager 1950 may manage location information of the electronic device. The graphic manager 1951 may manage a graphic effect to be provided to the user or a user interface (UI) related to the graphic effect. The security manager 1952 may provide all security functions necessary for system security or user authentication, and the like. According to an embodiment, when the electronic device (e.g., the electronic device 101) has a phone function, the middleware 1930 may further include a telephony manager (not shown) for managing a voice or video communication function of the electronic device.

The middleware 1930 may include a middleware module which configures combinations of various functions of the above-described components. The middleware 1930 may provide a module which specializes according to kinds of OSs to provide a differentiated function. Also, the middleware 1930 may dynamically delete some of old components or may add new components.

The API 1960 (e.g., an API 145 of FIG. 1) may be, for example, a set of API programming functions, and may be provided with different components according to OSs. For example, in case of Android or iOS, one API set may be provided according to platforms. In case of Tizen, two or more API sets may be provided according to platforms.

The application 1970 (e.g., an application program 147 of FIG. 1) may include one or more of, for example, a home application 1971, a dialer application 1972, a short message service/multimedia message service (SMS/MMS) application 1973, an instant message (IM) application 1974, a browser application 1975, a camera application 1976, an alarm application 1977, a contact application 1978, a voice dial application 1979, an e-mail application 1980, a calendar application 1981, a media player application 1982, an album application 1983, a clock application 1984, a health care application (e.g., an application for measuring quantity of exercise or blood sugar, and the like), or an environment information application (e.g., an application for providing atmospheric pressure information, humidity information, or temperature information, and the like), and the like.

According to an example embodiment, the application 1970 may include an application (hereinafter, for better understanding and ease of description, referred to as "information exchange application") for exchanging information between the electronic device (e.g., the electronic device 101) and an external electronic device (e.g., the first external electronic device 102 or the second external electronic device 104). The information exchange application may include, for example, a notification relay application for transmitting specific information to the external electronic device or a device management application for managing the external electronic device.

For example, the notification relay application may include a function of transmitting notification information, which is generated by other applications (e.g., the SMS/MMS application, the e-mail application, the health care application, or the environment information application, and the like) of the electronic device, to the external electronic device (e.g., the first external electronic device 102 or the second external electronic device 104). Also, the notification relay application may receive, for example, notification information from the external electronic device, and may provide the received notification information to the user of the electronic device.

The device management application may manage (e.g., install, delete, or update), for example, at least one (e.g., a function of turning on/off the external electronic device itself (or partial components) or a function of adjusting brightness (or resolution) of a display) of functions of the external electronic device (e.g., the first external electronic device 102 or the second external electronic device 104) which communicates with the electronic device, an application which operates in the external electronic device, or a service (e.g., a call service or a message service) provided from the external electronic device.

According to an example embodiment, the application 1970 may include an application (e.g., the health card application of a mobile medical device) which is preset according to attributes of the external electronic device (e.g., the first external electronic device 102 or the second external electronic device 104). According to an embodiment, the application 1970 may include an application received from the external electronic device (e.g., the server 106, the first external electronic device 102, or the second external electronic device 104). According to an embodiment, the application 1970 may include a preloaded application or a third party application which may be downloaded from a server. Names of the components of the program module 1910 according to various embodiments of the present disclosure may differ according to kinds of OSs.

According to various example embodiments, at least part of the program module 1910 may be implemented with software, firmware, hardware, or at least two or more combinations thereof. At least part of the program module 1910 may be implemented (e.g., executed) by, for example, a processor (e.g., a processor 1810 of FIG. 18). At least part of the program module 1910 may include, for example, a module, a program, a routine, sets of instructions, or a process, and the like for performing one or more functions.

The terminology "module" used herein may refer, for example, to a unit including one of hardware, software, and firmware or two or more combinations thereof. The terminology "module" may be interchangeably used with, for example, terminologies "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of a dedicated processor, a CPU, an application-specific integrated circuit (ASIC) chip, field-programmable gate arrays (FPGAs), or a programmable-logic device, which is well known or will be developed in the future, for performing certain operations.

According to various example embodiments, at least part of a device (e.g., modules or the functions) or a method (e.g., operations) may be implemented with, for example, instructions stored in computer-readable storage media which have a program module. When the instructions are executed by a processor (e.g., a processor 120 of FIG. 1), one or more processors may perform functions corresponding to the instructions. The computer-readable storage media may be, for example, a memory 130 of FIG. 1.

A computer-readable storage media may include a hard disc, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a ROM, a random access memory (RAM), or a flash memory, and the like), and the like. Also, the program instructions may include not only mechanical codes compiled by a compiler but also high-level language codes which may be executed by a computer using an interpreter and the like. The above-mentioned hardware device may be configured to operate as one or more software modules to perform operations according to various embodiments of the present disclosure, and vice versa.

According to various example embodiments, a storage medium which stores instructions is provided. The instructions may be configured to, when executed by at least one processor, cause the at least one processor to perform at least one operation. The at least one operation may include determining a connection between an electronic device and a second external electronic device via a second connector in the electronic device including a first connector including a first pin and a second pin for connecting the electronic device with a first external electronic device, the second connector for connecting the electronic device with the second external electronic device, and a switch and supplying power, received from the first external electronic device via the second pin, to the first pin if the electronic device and the second external electronic device are disconnected from each other.

According to various example embodiments, a storage medium which stores instructions is provided. The instructions may be configured to, when executed by at least one processor, cause the at least one processor to perform at least one operation. The at least one operation may include verifying reception of first power via a first pin from an external electronic device in an electronic device including a connector which includes a first pin and a second pin for connecting the electronic device with the external electronic device and supplying second power to the external electronic device via the second pin based on the at least reception of the first power.

According to various example embodiments, a storage medium which stores instructions is provided. The instructions may be configured to, when executed by at least one processor, cause the at least one processor to perform at least one operation. The at least one operation may include notifying a mobile terminal that an electronic device is connected with a power supply if the electronic device is attached to the power supply, supplying power to the mobile terminal via a first electronic path, transmitting notification that the electronic device is disconnected from the power supply to the mobile terminal if power is supplied from the mobile terminal via a second electronic path in response to detachment of the power supply from the electronic device, and stopping receiving the power via the second electronic path in response to the notification and receiving power from the mobile terminal via the first electronic path.

According to various example embodiments of the present disclosure, the electronic device may enhance user convenience and its utilization by being driven although the electronic device and the power supply are disconnected from each other.

Modules or program modules according to various example embodiments may include at least one or more of the above-mentioned components, some of the above-mentioned components may be omitted, or other additional components may be further included. Operations executed by modules, program modules, or other components may be executed by a successive method, a parallel method, a repeated method, or a heuristic method. Also, some operations may be executed in a different order or may be omitted, and other operations may be added. Example embodiments of the present disclosure described and illustrated in the drawings are provided as examples to describe technical content and to aid in understanding but do not limit the scope of the present disclosure. Accordingly, it should be understood that besides the various example embodiments listed herein, all modifications or modified forms derived based on the technical ideas of the present disclosure are included in the scope of the present disclosure as defined in the claims, and their equivalents.

What is claimed is:

1. An electronic device, comprising:
  a first connector comprising a first pin and a second pin configured to connect with a first external electronic device;
  a second connector configured to connect with a second external electronic device; and
  a switch configured to be selectively opened and closed in order to supply power received from the first external electronic device via the second pin to the first pin if the second external electronic device is disconnected from the electronic device,
  wherein one side of the switch is connected to a point of an electronic path connecting the first pin and the second connector, and the other side of the switch is connected to a backflow prevention circuit connected to the second pin.

2. The electronic device of claim 1, wherein the switch is configured to not supply the power received from the first external electronic device via the second pin to the first pin if the connection with the first external electronic device is detected.

3. The electronic device of claim 1, further comprising:
  a connection sensing circuit configured to sense whether the second external electronic device is connected to the first pin via the second connector; and
  a processor,
  wherein the processor is configured to:
  receive a signal associated with the second external device being connected to the first pin via the second connector via the connection sensing circuit; and
  control a connection of the switch based on the signal.

4. The electronic device of claim 1, further comprising:
  a connection sensing circuit configured to sense whether the second external electronic device is connected to the first pin via the second connector; and
  a processor,
  wherein the processor is configured to:
  sense another power received from the first external electronic device via the first pin using the connection sensing circuit or another connection sensing circuit; and
  control separation between a path of the power and a path of the other power using the switch in response to receiving the other power.

5. The electronic device of claim 1, wherein the second external electronic device comprises a power adaptor configured to supply power to the electronic device and/or the first external electronic device.

6. An electronic device, comprising:
  a first connector comprising a first pin and a second pin and configured to be attachable to a mobile terminal;
  a second connector configured to be attachable to a power supply; and
  a backflow prevention circuit electrically connected with the second pin and configured to not supply current from the electronic device to the mobile terminal via the second pin,
  wherein the first pin and the second connector establish a first electronic path,
  wherein one point on the first electronic path, the second pin, and the backflow prevention circuit establish a second electronic path, and
  wherein the backflow prevention circuit is configured to:

supply power to the mobile terminal via the first electronic path including via the first pin, based on the power supply being attached to the second connector; and receive power from the mobile terminal via the second electronic path, but not via the first pin, in response to detachment of the power supply from the second connector.

7. The electronic device of claim 6, further comprising:
a processor electrically connected with the first electronic path and/or the second electronic path.

8. The electronic device of claim 7, further comprising:
a first switch disposed between the one point on the first electronic path and the backflow prevention circuit,
wherein the processor is configured to:
close the first switch, if the power supply is attached to the second connector; and
transmit a signal notifying the mobile terminal of detachment of the power supply if the power supply is detached from the second connector and open the first switch if power is supplied via the first pin from the mobile terminal in response to transmitting the signal.

9. The electronic device of claim 8, further comprising:
a second switch disposed between the first pin and the one point on the first electronic path,
wherein the processor is configured to open the second switch if power is supplied via the second electronic path.

10. The electronic device of claim 7, further comprising:
a power adjustment circuit disposed between the one point on the first electronic path and the backflow prevention circuit,
wherein the power adjustment circuit is configured to:
supply power to the mobile terminal via the first electronic path if the power supply is attached to the second connector; and
receive power from the mobile terminal via the second electronic path, if the power supply is detached from the second connector.

11. The electronic device of claim 7, further comprising:
a logic circuit disposed between the one point on the first electronic path and the backflow prevention circuit,
wherein the logic circuit is configured to:
supply power, supplied via the first electronic path, to the processor, if a number of power paths supplied to the logic circuit is two paths; and
receive power from the mobile terminal via the second electronic path, if the number of power paths supplied to the logic circuit is not two paths.

12. A method of controlling an electronic device, the method comprising:
notifying a mobile terminal that the electronic device is connected with a power supply if the electronic device is attached to the power supply;
supplying power to the mobile terminal from the power supply via a first electronic path that includes a first pin of a first connector connected to the mobile terminal and a second connector for the power supply, based on the power supply being connected to the second connector;
receiving power from the mobile terminal via a second electronic path, and not via the first pin, in response to detachment of the power supply from the electronic device;

notifying the mobile terminal that the electronic device is disconnected from the power supply.

13. The method of claim 12, wherein the electronic device comprises a first switch,
further comprising:
closing the first switch if the electronic device is attached to the power supply; and
opening the first switch if the electronic device is detached from the power supply.

14. The method of claim 12, wherein the electronic device comprises a switch disposed on the first electronic path,
further comprising:
closing the switch if the electronic device is attached to the power supply; and
opening the switch if the electronic device is detached from the power supply.

15. The method of claim 12, wherein the electronic device comprises a power adjustment circuit,
further comprising:
supplying, by the power adjustment circuit, power to the mobile terminal via the first electronic path if the electronic device is attached to the power supply; and
receiving, by the power adjustment circuit, power from the mobile terminal via the second electronic path if the electronic device is detached from the power supply.

16. The method of claim 12, wherein the electronic device comprises a logic circuit,
further comprising:
supplying, by the logic circuit, power supplied via the first electronic path to the electronic device, if a number of power paths supplied to the logic circuit is two paths; and
receiving, by the logic circuit, power from the mobile terminal via the second electronic path, if the number of power paths supplied to the logic circuit is not two paths.

17. A non-transitory computer readable recording medium storing instructions for executing a method for controlling power of an electronic device, the instructions, when executed by a processor, causing the processor to:
notify a mobile terminal that the electronic device is connected with a power supply if the electronic device is attached to the power supply;
supply power to the mobile terminal, from the power supply, via a first electronic path that includes a first pin of a first connector connected to the mobile terminal and a second connector for the power supply, based on the power supply being connected to the second connector;
transmit notification to the mobile terminal that the electronic device is disconnected from the power supply, if receiving power from the mobile terminal via a second electronic path, and not via the first pin, in response to detachment of the power supply from the electronic device; and
stop receiving the power via the second electronic path in response to the notification of the disconnection and receive power from the mobile terminal via the first electronic path.

* * * * *